United States Patent
Kolluri et al.

(10) Patent No.: US 9,454,544 B1
(45) Date of Patent: *Sep. 27, 2016

(54) SELECTING DESTINATIONS OR POINTS OF INTEREST

(71) Applicant: Google Inc., Mountain View, CA (US)

(72) Inventors: Bala Venkata Sai Ravi Krishna Kolluri, Fremont, CA (US); Vikram Sahai, Los Altos, CA (US)

(73) Assignee: GOOGLE INC., Mountain View, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/853,999

(22) Filed: Mar. 29, 2013

Related U.S. Application Data

(60) Provisional application No. 61/794,562, filed on Mar. 15, 2013.

(51) Int. Cl.
*G06F 17/30* (2006.01)

(52) U.S. Cl.
CPC .............................. *G06F 17/30241* (2013.01)

(58) Field of Classification Search
CPC ................................................. G06F 17/3087
USPC .......................... 707/724, 918, 915; 701/426
See application file for complete search history.

(56) References Cited

U.S. PATENT DOCUMENTS

| | | |
|---|---|---|
| 6,504,571 B1 | 1/2003 | Narayanaswami et al. |
| 7,395,220 B2 | 7/2008 | Abrams et al. |
| 7,529,736 B2 | 5/2009 | Katariya et al. |
| 7,698,062 B1 * | 4/2010 | McMullen et al. ........... 701/438 |
| 7,836,050 B2 | 11/2010 | Jing et al. |

(Continued)

FOREIGN PATENT DOCUMENTS

| | | |
|---|---|---|
| EP | 2581703 | 4/2013 |
| WO | 2014025502 A1 | 2/2014 |
| WO | 2014149988 A1 | 9/2014 |

OTHER PUBLICATIONS

Corbett et al., "Spanner: Google's globally-distributed database," Proceedings of the 10th USENIX conference on Operating Systems Design and Implementation, 2012, 251-264.

(Continued)

*Primary Examiner* — Robert Beausoliel, Jr.
*Assistant Examiner* — Alexandria Bromell
(74) *Attorney, Agent, or Firm* — Johnson, Marcou & Isaacs, LLC

(57) ABSTRACT

Methods, systems, and apparatus, including computer programs encoded on computer storage media, for computerized travel services. One of the methods includes identifying points of interest or destinations associated with a travel location by querying a geographic data store that includes data mapping travel locations to points of interest or destinations; determining for each of the points of interest or destination: a count of travel related documents that refer to the point of interest or destination, a count of travel related queries that refer to the point of interest or destination, a count of photographs that are geographically related to the point of interest or destination, and a popularity score based at least in part on the count of travel documents, the count of travel queries, and the count of photographs; and selecting a selected point of interest or destination based at least in part on the respective popularity scores.

26 Claims, 14 Drawing Sheets

(56) References Cited

U.S. PATENT DOCUMENTS

| | | | |
|---|---|---|---|
| 8,090,222 B1 | 1/2012 | Baluja et al. | |
| 8,433,512 B1 | 4/2013 | Lopatenko et al. | |
| 8,484,057 B2 | 7/2013 | Crean et al. | |
| 8,538,973 B1 | 9/2013 | Gonzalez et al. | |
| 8,566,029 B1 | 10/2013 | Lopatenko et al. | |
| 8,620,579 B1 | 12/2013 | Upstill et al. | |
| 9,076,079 B1* | 7/2015 | James | G06Q 30/0627 707/707 |
| 2004/0007825 A1 | 1/2004 | Newberg et al. | |
| 2007/0005590 A1 | 1/2007 | Thrasher et al. | |
| 2007/0271297 A1 | 11/2007 | Jaffe et al. | |
| 2008/0016472 A1 | 1/2008 | Rohlf et al. | |
| 2008/0297409 A1* | 12/2008 | Klassen et al. | 342/357.06 |
| 2009/0143977 A1 | 6/2009 | Beletski et al. | |
| 2009/0189811 A1* | 7/2009 | Tysowski et al. | 342/357.15 |
| 2009/0216633 A1 | 8/2009 | Whitsett et al. | |
| 2009/0279794 A1 | 11/2009 | Brucher et al. | |
| 2010/0290699 A1 | 11/2010 | Adam et al. | |
| 2011/0022425 A1 | 1/2011 | Block et al. | |
| 2011/0046881 A1 | 2/2011 | Karaoguz et al. | |
| 2011/0093515 A1* | 4/2011 | Albanese | 707/812 |
| 2011/0184949 A1 | 7/2011 | Luo et al. | |
| 2011/0211737 A1* | 9/2011 | Krupka et al. | 382/118 |
| 2011/0301835 A1 | 12/2011 | Bongiorno et al. | |
| 2011/0302124 A1 | 12/2011 | Cai et al. | |
| 2011/0317885 A1 | 12/2011 | Leung et al. | |
| 2012/0185793 A1 | 7/2012 | Binsztok et al. | |
| 2012/0191492 A1 | 7/2012 | Diba et al. | |
| 2012/0303626 A1* | 11/2012 | Friedmann et al. | 707/740 |
| 2012/0315884 A1 | 12/2012 | Forutanpour et al. | |
| 2013/0030849 A1 | 1/2013 | Bongiorno et al. | |
| 2013/0103697 A1* | 4/2013 | Hill et al. | 707/748 |
| 2013/0110631 A1* | 5/2013 | Mitchell et al. | 705/14.58 |
| 2013/0132836 A1* | 5/2013 | Ortiz | 715/716 |
| 2013/0246409 A1* | 9/2013 | Polansky et al. | 707/724 |
| 2013/0290324 A1 | 10/2013 | Gibergues et al. | |
| 2013/0337830 A1* | 12/2013 | Haro et al. | 455/456.1 |
| 2014/0104280 A1 | 4/2014 | Ofstad et al. | |
| 2014/0236916 A1* | 8/2014 | Barrington et al. | 707/706 |
| 2014/0274161 A1* | 9/2014 | Venkatraman et al. | 455/456.6 |
| 2014/0279261 A1 | 9/2014 | Kolluri et al. | |
| 2014/0280103 A1* | 9/2014 | Harris et al. | 707/724 |

OTHER PUBLICATIONS

Chang et al., "Bigtable: A Distributed Storage System for Structured Data," OSBI '06: 7$^{th}$ USENIX Symposium on Operating Systems Design Implementation, 2006, 205-218.

Cai, Final Office Action issued in co-pending U.S. Appl. No. 13/853,990, filed Mar. 29, 2013, Aug. 26, 2015, 1-12.

Cai, Office Action issued in co-pending U.S. Appl. No. 13/853,990, filed Mar. 29, 2013, Nov. 21, 2014, 1-15.

De Choudhury, et al., "Automatic Construction of Travel Itineraries using Social Breadcrumbs", HT'10, Jun. 13-16, 2010 toronto Ontario, Canada, Copyright 2010 ACM 978-1-4503-0041-Apr. 10, 2006, 1-10.

Fujita, Final Office Action issued in co-pending U.S. Appl. No. 13/853,996, filed Mar. 29, 2013, Jul. 17, 2015, 1-40.

Fujita, Office Action issued in co-pending U.S. Appl. No. 13/853,996, filed Mar. 29, 2013, Nov. 5, 2014, 1-31.

Gao, et al., W2Go: A Travel Guidance System by Automatic Landmark Ranking, MM'10, Oct. 25-29, 2010, Fierenze, Italy; Copyright 2010 ACM 978-1-60558-933-Jun. 10, 2010, 1-10.

Jang, International Search Report and Written Opinion issued in International Application No. PCT/US2014/021747, Jun. 27, 2014, 1-9.

U.S. Appl. 13/853,990 to Kolluri et al., filed Mar. 29, 2013.

U.S. Appl. No. 13/853,996 to James et al., filed Mar. 29, 2013.

U.S. Appl. No. 13/853,997 to James et al., filed Mar. 29, 2013.

Fujita, U.S. Office Action issued in copending U.S. Appl. No. 13/853,996, filed Mar. 29, 2013, mailed Jan. 8, 2016, 40 pages.

Nickitas-Etienne, International Preliminary Report on Patentability issued in International Application No. PCT/US2014/021747, mailed on Sep. 24, 2015, 6 pages.

* cited by examiner

SELECTING DESTINATIONS OR POINTS OF INTEREST

CROSS-REFERENCE TO RELATED APPLICATIONS

This application claims priority to U.S. Provisional Application Ser. No. 61/794,562, filed Mar. 15, 2013, entitled "Destination and Point of Interest Search," which is hereby incorporated by reference in its entirety.

BACKGROUND

This specification relates generally to computerized travel services.

The Internet is used to plan travel. Most often, users submit very specific travel queries to Internet travel search engines and are presented with very specific travel query results. This is often insufficient for users who lack a clear plan or wish to explore multiple travel options.

SUMMARY

This specification describes technologies relating to computerized travel services.

In general, one innovative aspect of the subject matter described in this specification can be embodied as a method, system, or computer programs recorded on one or more computer storage devices for selecting destinations or points of interest. Multiple points of interest or destinations are identified as geographically related to a travel location. One or more of the multiple points of interest or destinations are selected based on a popularity score. The popularity score can be determined based on at least in part on travel related documents, travel related queries, and or photographs.

In general, another innovative aspect of the subject matter described in this specification can be embodied in methods that include the actions of: receiving natural feature mapping data, the natural feature mapping data representing geographic footprints of multiple natural features; receiving political feature mapping data, the political feature mapping data representing geographic footprints of multiple political features; classifying the natural features as a destination or not a destination, including: classifying at least one of the natural features as a destination based at least in part on determining that the geographic footprint of the natural feature overlaps with more than one of the geographic footprints of the political features, and storing data representing the natural features classified as a destination in a geographic data store. Other embodiments of this aspect include corresponding computer systems, apparatus, and computer programs recorded on one or more computer storage devices, each configured to perform the actions of the methods.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the actions.

In general, another innovative aspect of the subject matter described in this specification can be embodied in methods that include the actions of: receiving natural feature mapping data, the natural feature mapping data representing geographic footprints of multiple natural features; receiving political feature mapping data, the political feature mapping data representing geographic footprints of multiple political features; classifying each of the natural features as a point of interest or not a point of interest, including: classifying at least one of the natural features as a point of interest based at least in part on determining that the geographic footprint of the natural feature is contained within one of the geographic footprints of the political features, and storing data representing the natural features classified as a point of interest in a geographic data store. Other embodiments of this aspect include corresponding computer systems, apparatus, and computer programs recorded on one or more computer storage devices, each configured to perform the actions of the methods.

In general, another innovative aspect of the subject matter described in this specification can be embodied in methods that include the actions of: receiving data indicative of a point of interest or destination, e.g., a city, and a time of the year; identifying photographs using an index of photographs, the photographs being identified from the index as photographs geographically related to the point of interest or destination and having a creation timestamp corresponding to the time of the year; determining for each of the photographs, a relevancy score based at least in part on: selection success data of the photograph for image queries referring to the point of interest or destination, and references to the point of interest or destination in documents associated with the photograph; and selecting a selected photograph from the photographs based at least in part on a respective visual quality score and the respective relevancy scores, the visual quality score representing a degree of visual quality of the respective photographs. Other embodiments of this aspect include corresponding computer systems, apparatus, and computer programs recorded on one or more computer storage devices, each configured to perform the actions of the methods.

In general, another innovative aspect of the subject matter described in this specification can be embodied in methods that include the actions of: receiving data indicative of a point of interest or destination, e.g., a city, and an activity; identifying photographs using an index of photographs, the photographs being identified from the index as photographs geographically related to the point of interest or destination; determining for each of the photographs, a relevancy score based at least in part on: first selection success data of the photograph for image queries referring to the point of interest or destination, second selection success data of the photograph for image queries referring to the activity, references to the point of interest or destination in documents associated with the photograph, and references to the activity in documents associated with the photograph; and a selected photograph from the photographs based at least in part on a respective visual quality score and the respective relevancy scores, the visual quality score representing a degree of visual quality of the respective photographs. Other embodiments of this aspect include corresponding computer systems, apparatus, and computer programs recorded on one or more computer storage devices, each configured to perform the actions of the methods.

In general, another innovative aspect of the subject matter described in this specification can be embodied in methods that include the actions of: receiving data indicative of a destination, e.g., a city; identifying points of interest associated with the destination by querying a geographic data store that includes data mapping destinations to points of interest; for each of the points of interest: identifying photographs using an index of photographs, the photographs being identified from the index as photographs geographically related to the point of interest, determining for each of the photographs a relevancy score based at least in part on selection success data of the photograph for image queries referring to the point of interest and references to the point of interest in documents associated with the photograph, and selecting a selected point of interest photograph from the photographs based at least in part on a respective visual quality score and the respective relevancy scores, the visual quality score representing a degree of visual quality of the respective photographs; and selecting a selected destination photograph from the selected point of interest photographs. Other embodiments of this aspect include corresponding computer systems, apparatus, and computer programs recorded on one or more computer storage devices, each configured to perform the actions of the methods.

In general, another innovative aspect of the subject matter described in this specification can be embodied in methods that include the actions of: identifying points of interest or destinations, e.g., cities, associated with a travel location by querying a geographic data store that includes data mapping travel locations to points of interest or destinations; determining for each of the points of interest: a count of travel related documents that refer to the point of interest or destination, a count of travel related queries that refer to the point of interest or destination, a count of photographs that are geographically related to the point of interest or destination, and a popularity score based at least in part on the count of travel documents, the count of travel queries, and the count of photographs; and selecting a selected point of interest or destination based at least in part on the respective popularity scores. Other embodiments of this aspect include corresponding computer systems, apparatus, and computer programs recorded on one or more computer storage devices, each configured to perform the actions of the methods.

In general, another innovative aspect of the subject matter described in this specification can be embodied in methods that include the actions of: receiving a travel query; determining an origin location, a time frame, and a travel location based at least in part on the travel query; identifying points of interest or destinations, e.g., cities, associated with the travel location by querying a geographic data store that includes data mapping travel locations to points of interest or destinations; for each of the points of interest or destinations: determining, photographs that are geographically related to the point of interest or destination according to an index of photographs, selecting a selected photograph from the photographs based at least in part on a respective visual quality score, the visual quality score representing a degree of visual quality of the respective photograph, and a respective relevancy score, the relevancy score representing a degree of relevance to the point of interest or destination of the respective photograph; obtaining a description associated with the point of interest or destination, obtaining a hotel price associated with the point of interest or destination and with the time frame, and obtaining a flight price for a flight corresponding to the origin location, the point of interest or destination, and the time frame; and providing for each of the points of interest or destinations, a query result including the respective selected photograph, the respective description, the respective hotel price, and the respective flight price. Other embodiments of this aspect include corresponding computer systems, apparatus, and computer programs recorded on one or more computer storage devices, each configured to perform the actions of the methods.

In general, another innovative aspect of the subject matter described in this specification can be embodied in methods that include the actions of: receiving a request identifying a destination, e.g., a city, the request also identifying a time frame and an origin location; identifying destination photographs using an index of photographs, the destination photographs being identified from the index as photographs geographically related to the destination; selecting a selected destination photograph from the destination photographs based at least in part on a respective first visual quality score, the first visual quality score representing a degree of visual quality of the respective destination photograph, and a respective first relevancy score, the first relevancy score representing a degree of relevance to the destination of the respective destination photograph; obtaining a destination description associated with the destination; obtaining hotel data identifying a hotel associated with the destination, the hotel data including a hotel price; obtaining flight data identifying a flight corresponding to the destination, the origin location, and the time frame; identifying points of interest associated with the destination; for each of the points of interest: identifying point of interest photographs using the index of photographs, point of interest photographs being identified from the index as photographs geographically related to the point of interest, and selecting, a selected point of interest photograph from the point of interest photographs based at least in part on a respective second visual quality score, the second visual quality score representing a degree of visual quality of the respective point of interest photograph, and a respective second relevancy score, the second relevancy score representing a degree of relevance to the point of interest of the respective point of interest photograph; obtaining respective point of interest descriptions associated with each of the points of interest; and providing a destination page, the destination page including the selected destination photograph, the hotel price, the flight data, the destination description, the selected point of interest photographs, and the point of interest descriptions. Other embodiments of this aspect include corresponding computer systems, apparatus, and computer programs recorded on one or more computer storage devices, each configured to perform the actions of the methods.

In general, another innovative aspect of the subject matter described in this specification can be embodied in methods that include the actions of: receiving a search request identifying a point of interest; identifying point of interest photographs using an index of photographs, the point of interest photographs being identified from the index as photographs geographically related to the point of interest; selecting a selected point of interest photograph from the point of interest photographs based at least in part on a respective first visual quality score, the first visual quality score representing a degree of visual quality of the respective point of interest photograph, and a respective first relevancy score, the first relevancy score representing a degree of relevance to the point of interest of the respective point of interest photograph; obtaining a point of interest description associated with the point of interest; obtaining hotel data identifying a hotel associated with the point of interest, the hotel data including a hotel description; identifying other points of interest associated with the point of interest; for each of the other points of interest: identifying other point of interest photographs using the index of photographs, the other point of interest photographs being identified from the index as photographs geographically related to the other point of interest, and selecting a selected other point of interest photograph from the other point of interest photographs based at least in part on a respective second visual quality score, the second visual quality score representing a degree of visual quality of the respective other point of interest photograph, and a respective second relevancy score, the second relevancy score representing a degree of relevance to the other point of interest of the respective other point of interest photograph; obtaining respective other point of interest descriptions associated with each of the other points of interest; and providing a point of interest page, the point of interest page including, the selected point of interest photograph, the point of interest description, the hotel description, the selected other point of interest photographs, and the other point of interest descriptions. Other embodiments of this aspect include corresponding computer systems, apparatus, and computer programs recorded on one or more computer storage devices, each configured to perform the actions of the methods.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 11 illustrates an example travel search engine interface.

DETAILED DESCRIPTION

Figure 1:
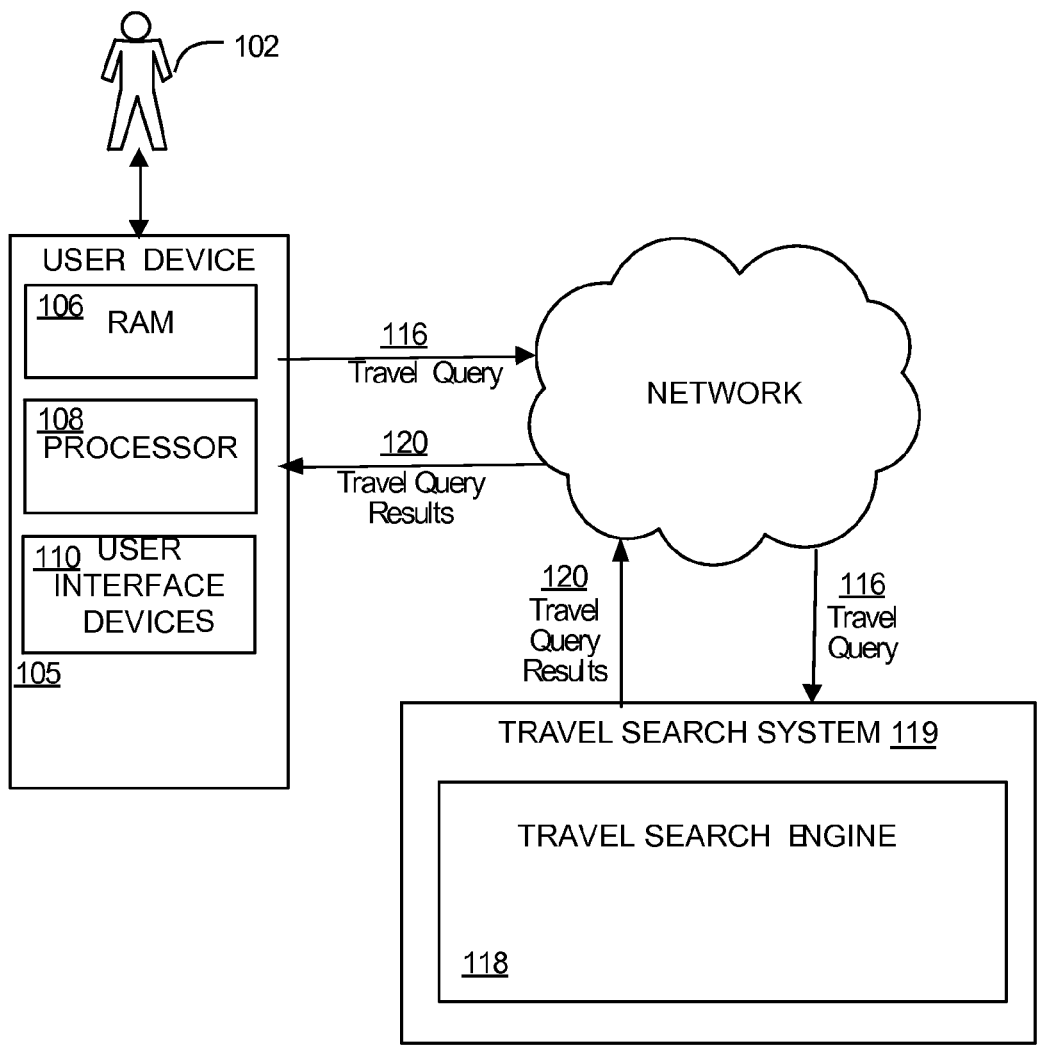
FIG. 1 illustrates an example travel search engine system.

FIG. 1 illustrates an example travel search engine system 119 as can be implemented for use in an Internet, an intranet, or another client and server environment. The travel search engine system 119 can be implemented as, for example, computer programs running on one or more computers in one or more locations that are coupled to each other through a network. The travel search engine system 119 includes a travel search engine 118, as described in more detail below with reference to FIG. 2. The travel search engine system 119 produces travel query results 120 from a travel query 116. The systems, components, and techniques described below can be implemented in the example travel search engine system 119.

A user 102 can interact with the travel search engine system 119 through a user device 105. In some implementations, the user device 105 can communicate with the travel search engine system 119 over a network. For example, the user device 105 can be a computer coupled to the travel search engine system 119 through one or more wired or wireless networks, e.g., mobile phone networks, local area networks (LANs) or wide area networks (WANs), e.g., the Internet. In some implementations, the user device 105 can communicate directly with the travel search engine system 119. For example, the travel search engine system 119 and the user device 105 can be implemented on one machine. For example, a user can install the travel search engine system 119 on the user device 105. The user device 105 will generally include a random access memory (RAM) 106, a processor 108, and one or more user interface devices 110, e.g., a display or a speaker for output, and a keyboard, mouse, microphone, or touch sensitive display for input.

A user 102 can use the user device 105 to submit a travel query 116 to the travel search engine system 119. For example, the user can use the one or more user interface devices 110 of the user device 105 to enter the travel query 116 in a user interface provided by travel search engine system 119, e.g., in a single query text input field of a web page. The travel query 116 can be text or audio and can be in natural language form. The travel query 116 can be associated with query metadata. The query metadata can be data associated with or provided by the user device 105 and can be, for example, location, IP address, date, time, and user preferences. The user device 105 can provide such metadata in an HTTP (Hypertext Transfer Protocol) request that also includes the travel query 116, for example. The scope of the travel query 116 can be defined by a number of terms or parameters, including: an origin location, a travel location, a timeframe, an activity, flight preferences, hotel preferences, and pricing preferences. These are described in greater detail below, with reference to FIGS. 7-10. The terms or parameters can be explicitly included by the user in the travel query 116 or can be inferred by either the user device 105 or the search engine system 119 based at least in part on the query metadata or other relevant data.

The travel search engine 118 responds to the received travel query 116 by obtaining travel query results 120 that are responsive to the travel query 116. A travel query result represents a travel option, e.g., a destination or point of interest. The travel query results 120 are transmitted through a network to the user device 105 and presented in an organized fashion to the user 102, e.g., on a travel search engine results web page displayed in a web browser running on the user device 105. Other search results generated by the search engine can be optionally presented with the travel query results 120. Each travel query result 120 can include a description of the represented travel option and a hyperlink to a site or sites that allow the user to book the different components of the travel option.

Figure 2:
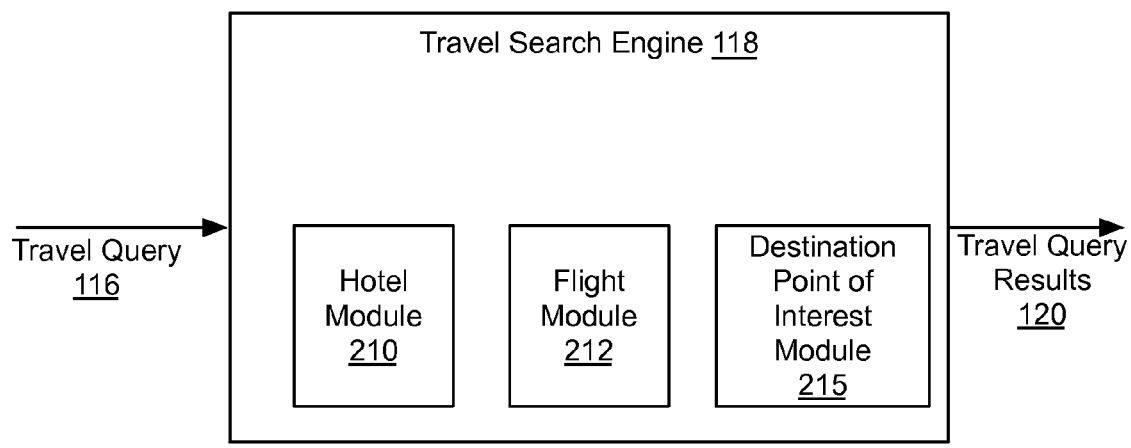
FIG. 2 illustrates an example travel search engine.

FIG. 2 illustrates an example travel search engine 118. As shown in FIG. 2, travel search engine 118 includes a hotel module 210, a flight module 212, and a destination point of interest module 215. The travel search engine 118 can be implemented as, for example, computer programs running on one or more computers in one or more locations that are coupled to each other through a network.

The travel search engine 118 is configured to receive the travel query 116 and return travel query results 120. The travel search engine 118 can employ any of its modules to produce the travel query results 120 based at least in part on the travel query 116. The travel search engine 118 submits a request to any of its modules. The request can include the travel query 116 and query metadata, or portions thereof. The travel search engine 118 receives a response from any of its modules and can use the contents of the response to produce travel query results 120. The response can include one or more travel query results and or other data that can be used to produce travel query results, e.g., digital photographs, descriptions, flight data, or hotel data. Responses and requests are issued and received, for example, by using function calls, messages, or shared data.

In some implementations, some or all of the hotel module 210, the flight module 212, and the destination point of interest module 215 can be implemented as part of travel search engine 118 or travel search engine system 119. For example, they can be implemented on the same computer or computers as the travel search engine 118 and or share a network with the travel search engine 118. In some implementations, some or all of the hotel module 210, the flight module 212, and the destination point of interest module 215 can be implemented separately from the travel search engine 118 or travel search engine system 119. For example, they can be implemented on different computers than the travel search engine 118 and communicate with the travel search engine 118 and or each other over a network, e.g., the Internet.

Figure 3:
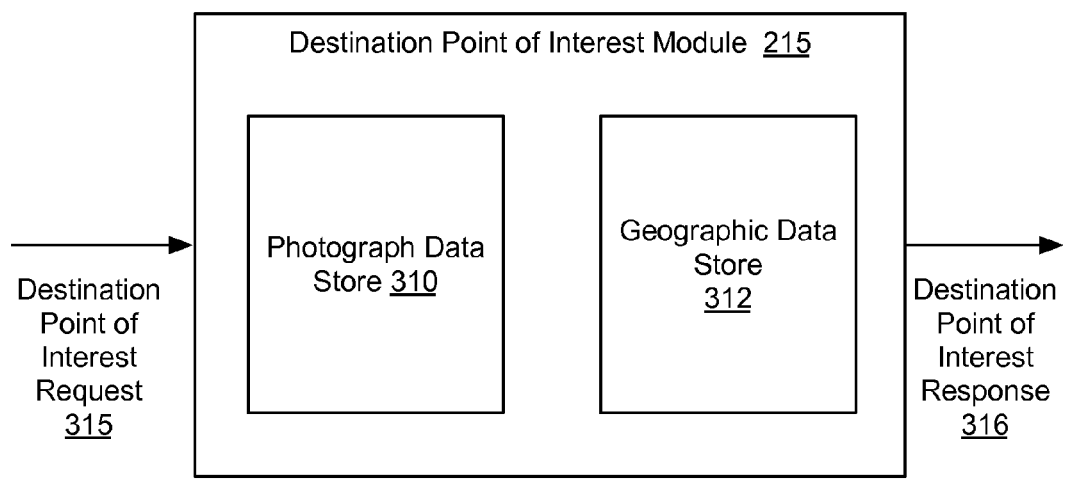
FIG. 3 illustrates an example destination point of interest module.

The hotel module 210, the flight module 212, and the destination point of interest module 215 can each include or be in communication with a corresponding data store residing locally or remotely. In some implementations, these include a hotel data store for the hotel module 210, a flight data store for the flight module 212, and, for the destination point of interest module 215, a photograph data store 310 and a geographic data store 312 (FIG. 3). In some implementations, one or more of the data stores can be implemented as a file, database, multiple files, or multiple databases on a distributed data storage infrastructure, e.g., infrastructures of the kind described in Corbett et al., Spanner: Google's globally-distributed database, Proceedings of the 10th USENIX conference on Operating Systems Design and Implementation (2012), or infrastructures of the kind described in Chang et al., Bigtable: A Distributed Storage System for Structured Data, in Transactions on Computer Systems (June 2008), or on some other storage infrastructure, implemented on computer readable and writable memory devices.

Hotel module 210 receives requests from the travel search engine 118 and issues responses to the travel search engine 118. The hotel module 210 can also receive requests from and issue responses to any of the other modules in travel search engine 118. A request can include a travel location and a timeframe. These are described in greater detail below, with reference to FIGS. 8-10. Here, the hotel module 210 can query the hotel data store for hotels that are available during the timeframe and are related to the travel location. The hotel module 210 determines that a hotel is related to a travel location using one or more metrics, including whether the hotel's geographic location is within a threshold distance from the travel location. Additionally, a request can also include additional criteria, e.g., a price preference, a user feedback rating preference, or a hotel star preference. Here, the hotel module 210 can query the hotel data store for hotels that match the additional criteria. The hotel module 210 can issue a response to the travel search engine 118 or any of the modules in the travel search engine 118. The response can include information about one or more hotels, which may include, e.g., titles, images, prices, availability, star ratings, user feedback ratings, locations, or descriptions.

Flight module 212 receives requests from the travel search engine 118 and issues responses to the travel search engine 118. The flight module 212 can also receive requests from and issue responses to any of the other modules in the travel search engine 118. A request can include a travel location, an origin location, or a timeframe. These are described in greater detail below, with reference to FIGS. 8-10. Here, the flight module 212 can query the flight data store for flights available during the timeframe that are related to the travel location and the origin location. The flight module 212 can determine that a flight is related to a travel location and the origin location using one or more metrics, including whether the geographic location of one of the airports associated with the flight is within a threshold distance from the travel location or the origin location. Additionally a request can also include additional criteria, e.g., a price preference, a cabin preference, e.g., first-class, a user feedback rating preference, a number of stops preference, an airline preference, a plane type preference, or a time length preference. The flight module 212 can query the flight data store for flights that match the additional criteria. The flight module 212, can issue a response to the travel search engine 118 or any of the modules in the travel search engine 118. The response can include information about of one or more flights, e.g., descriptions, airlines, flight numbers, flight times, flight durations, stops, price, user feedback ratings, locations, or availability.

Destination point of interest module 215 receives requests from travel search engine 118 and issues responses to travel search engine 118. The destination point of interest module 215 can also receive requests from any of the other modules in the travel search engine 118. The destination point of interest module 215 can issue responses to the travel search engine 118 or any of the other modules in the travel search engine 118. The destination point of interest module 215 is described in greater detail below, with reference to FIG. 3.

FIG. 3 illustrates an example destination point of interest module 215. As illustrated in FIG. 3, the destination point of interest module 215 receives a destination point of interest request 315 and issues a destination point of interest response 316. The destination point of interest module 215 includes a photograph data store 310 and a geographic data store 312.

The destination point of interest module 215 receives a destination point of interest request 315, for example from travel search engine 118 or any of its modules. The request 315 can include one or more terms, including a travel location, a timeframe, or an activity. The destination point of interest module 215 can query the geographic data store 312 for destinations or points of interest associated with the travel location and optionally the activity. The destination point of interest module 215 can also query the photograph data store 310 for digital photographs associated with the travel location, a destination, a point of interest, the timeframe, or the activity. The destination point of interest module can take the results of the query to the geographic data store 312 and or the query to the photograph data store 310 and produce destination point of interest response 316.

The photograph data store 310 stores digital photographs or references to digital photographs, e.g., links, identifiers, or memory references. The photograph data store 310 can store the digital photographs or references to the digital photographs on one or more non-volatile mediums, including magnetic hard drives, solid-state drives, memory, optical disks, or tapes.

In some implementations, the photograph data store 310 stores photograph metadata associated with the digital photographs or the references to the digital photographs. The photograph metadata can be formatted in or derived from one or more standards including Exchangeable Image File Format (EXIF), Tagged Image File Format (TIFF), and Design rule for Camera File (DCF). In some implementations, some or all of the photograph metadata is stored separately from the digital photographs or the references to the digital photographs. The photograph metadata can include geographic or geo-tag metadata, e.g., Global Positioning System (GPS) or Assisted GPS (A-GPS) coordinates. Additionally, the photograph metadata can include camera metadata, e.g., the camera model or camera settings including, e.g., aperture, shutter speed, focal length, ISO speed, or resolution. Additionally, the photograph metadata can include temporal metadata, e.g., a creation timestamp that reflects when a photograph was taken or captured. Additionally, the photograph metadata can include topical metadata, e.g., a title or tags.

In some implementations, the photograph metadata includes document metadata for documents that include or reference a photograph. The document metadata can include the title of the photograph in the document, text from the document, the title of the document, or a URL for the document. The document metadata is drawn from one or more types of documents, including HyperText Markup Language (HTML) documents, word processing documents, imaged documents, or presentation documents. The documents can be obtained from multiple sources including the Internet, social networking websites, and photo sharing websites in accordance with user privacy policies and expectations and copyright law. In some implementations, the documents are identified using an Internet image search.

In some implementations, the photograph metadata can include photographer metadata, for example, references, e.g., links, identifiers, or memory references to other photos taken by the photographer, an identification for the photographer, a user feedback rating of the photographer, and a quality rating for the photographer. The photographer metadata can be obtained or determined from social networking websites and photo sharing websites in accordance with user privacy policies and expectations and copyright law.

In some implementations, the photograph data store 310 is associated with one or more indices. The indices are based at least in part on attributes or metadata associated with the digital photographs or references to the digital photographs stored in the photograph data store 310. For example, the digital photographs or references to the digital photographs in the photograph data store 310 can be indexed by geographic location based at least in part on their respective geographic or geo-tag metadata or associated destinations or points of interest. Each of the indices can include one or more sub-indices based at least in part on the same or different attributes or metadata. The indices can be stored in the photograph data store 310 or separately from the photograph data store 310.

The geographic data store 312 stores geographic data regarding points of interests or destinations. For each of the points of interest or destinations, the geographic data store 312 stores a variety of data, e.g., geographic coordinates or locations, names, or categories. The geographic data store 312 can store the geographic data on one or more nonvolatile mediums, including magnetic hard drives, solid-state drives, memory, optical disks, or tapes.

The geographic data includes data classifying geographic entities, e.g., places or locations, as either destinations or points of interest. Generally, geographic entities that have a large geographic footprint are more likely to be classified as destinations. For example, continents, subcontinents, countries, regions of countries, states, regions of states, counties, neighborhoods, and cities would all be classified as destinations. Conversely, entities that have a small geographic footprint are more likely to be classified as points of interest. For example, points of interest can include hotels, restaurants, amusement parks, landmarks, statues, museums, parks, zoos, bars, nightclubs, and resorts.

In some implementations, the geographic data represents a logical hierarchy reflective of the relationships between destinations and points of interest. The logical hierarchy can represent that a destination may contain one or more smaller destinations as well as one or more points of interest. The logical hierarchy can be multileveled with points of interest at the bottom or dispersed throughout. For example, a first destination could contain a smaller second destination, which could contain an even smaller third destination, which could contain one or more points of interest. In this example, the points of interest contained by the even smaller third destination are also associated with the second destination and the first destination because the points of interest fall under the second destination and the first destination in the logical hierarchy. The hierarchy can be represented in any convenient conventional way.

In some implementations, geographic entities are classified based at least in part on initial mapping data. The initial mapping data can be political mapping data, natural mapping data, or a combination of the two, and can come from one or more sources. The initial mapping data can be for the entire earth or some subsection or subsections of the earth. The initial mapping data can be in a Geographic Information System (GIS) format, Geography Markup Language (GML) format, OpenStreetMap (OSM) format, or other mapping data format. The initial mapping data can define polygons or other shapes the represent the geographic footprint for a location or place. The initial mapping data can represent geographic entities that are predefined as continents, subcontinents, countries, regions of countries, states, regions of states, counties, cities, neighborhoods, or some other definition that is associated with a reasonably large geographic footprint. These geographic entities are classified as destinations. Additionally, the initial mapping data can represent geographic entities that are predefined as hotels, restaurants, amusement parks, landmarks, statues, museums, parks, zoos, bars, nightclubs, resorts, or some other definition that is associated with a reasonably small geographic footprint. These geographic entities are classified as points of interest.

In some implementations, the destination point of interest module 215 and geographic data store 312 are configured to construct the logical hierarchy based at least in part on a hierarchy supplied by the initial mapping data. In some cases, the initial mapping data may represent a hierarchy. The destination point of interest module 215 can extract the hierarchy of the initial mapping data and use it to construct its own hierarchy in the geographic data store 312.

In some implementations, the system constructs the logical hierarchy based at least in part on geographic footprints or locations. Here, geographic footprints for geographic entities classified as destinations are obtained and compared to identify destinations whose entire geographic footprint or substantially entire geographic footprint is contained within the geographic footprint of another destination. The logical hierarchy is then structured to indicate that each destination contains or substantially contains the destination below it in the hierarchy based at least in part on their respective geographic footprints. Geographic entities classified as points of interest are added to the logical hierarchy based at least in part on their geographic locations or footprints. For example, the system can assign one or more points of interest to a destination where the points of interest have geographic locations or footprints that are entirely or substantially contained by the geographic footprint of the destination. Optionally, a point of interest could be pushed down the logical hierarchy such that it is assigned to the lowest destination on the logical hierarchy that contains the point of interest.

In some implementations, the geographic data store 312 is configured to allow for searching by travel location. Here the geographic data store 312 can include geographic coordinates or other geographic positioning data for the geographic entities classified as destinations or points of interests. As described in greater detail with respect to FIGS. 6 and 8, the geographic coordinates or other geographic positioning data or the logical hierarchy can be used to map a travel location that is the subject of the search to one or more destinations or points of interest.

Figure 4:
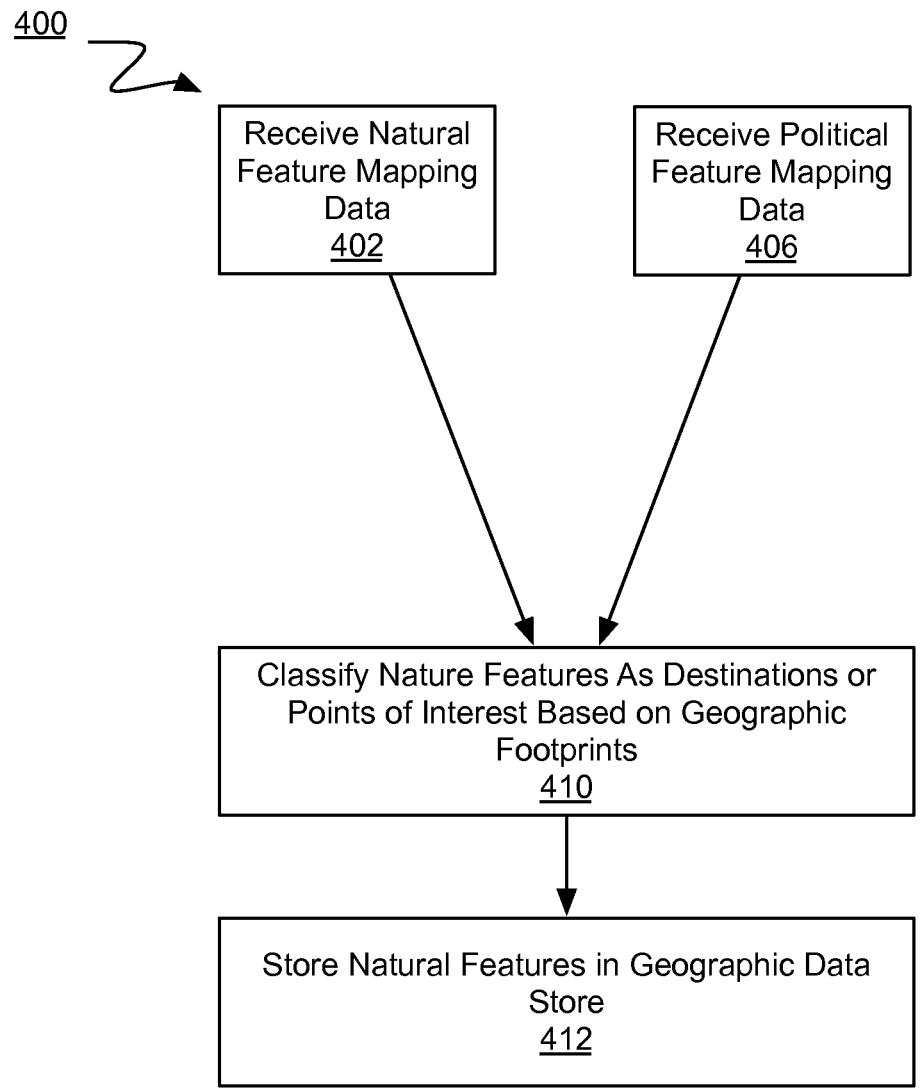
FIG. 4 illustrates an example method for classifying natural features.

FIG. 4 illustrates an example method 400 for classifying natural features as either points of interest or destinations. As shown in FIG. 4, natural features are classified as either destinations or points of interest and the result is stored in the geographic data store 312, as described below.

The system receives natural feature mapping data (402). The natural feature mapping data is received in one or more ways including, as an argument in a function call, a query result from a data store, as a memory reference, or as a data transmission. The natural feature mapping data can be received in one or more formats, including GIS, GML, and OSM and include data representing one or more natural features. Natural features can be classified in the natural feature mapping data in categories including mountains, mountain ranges, lakes, seas, oceans, rivers, bays, islands, creeks, streams, valleys, forests, and deserts. Additionally, the system can receive natural feature mapping data that includes data representing geographic footprints for the natural features. The system extracts the data representing the natural features and the data representing the geographic footprints to identify multiple natural features and their geographic footprints.

The system receives political feature mapping data (406). The political feature mapping data is received in one or more ways including, as an argument in a function call, a query result from a data store, as a memory reference, or as a data transmission. The political feature mapping data can be received in one or more formats, including GIS, GML, or OSM and include data representing one or more political features. Political features can be classified in the political feature mapping data in categories including continents, subcontinents, countries, regions of countries, states, regions of states, counties, neighborhoods, or cities. Additionally, the system can receive political feature mapping data that includes data representing geographic footprints for the political features. The system extracts the data representing the political features and the data representing the geographic footprints to identify multiple political features and their geographic footprints.

The system classifies one or more of the natural features as a destination or a point of interest based at least in part on geographic footprints (410). In some implementations, if the geographic footprint of a particular natural feature overlaps with at least two of the geographic footprints of the political features, the particular natural feature is classified as a destination. In some implementations, the system requires that at least a minimum threshold portion of the geographic footprint of the natural feature intersect with the geographic footprint of the political feature before the two will be considered to overlap. Additionally, the political features considered can be restricted to one or more categories, for example states.

In some implementations, where the geographic footprint of a natural feature is contained within one of the geographic footprints of the political features, the particular natural feature is classified as a point of interest. In some implementations, the system requires that at least a minimum threshold portion of the geographic footprint of the natural feature intersect with the geographic footprint of the political feature for a natural feature to be contained by a political feature. Additionally, the political features considered can be restricted to one or more categories, for example cities.

The system stores data representing the natural features as either a destination or a point of interest in the geographic data store 312 (412). The data representing the natural features can include one or more pieces of data related to the natural features, e.g., names, geographic coordinates, shapes, categories, or classifications.

Figure 5:
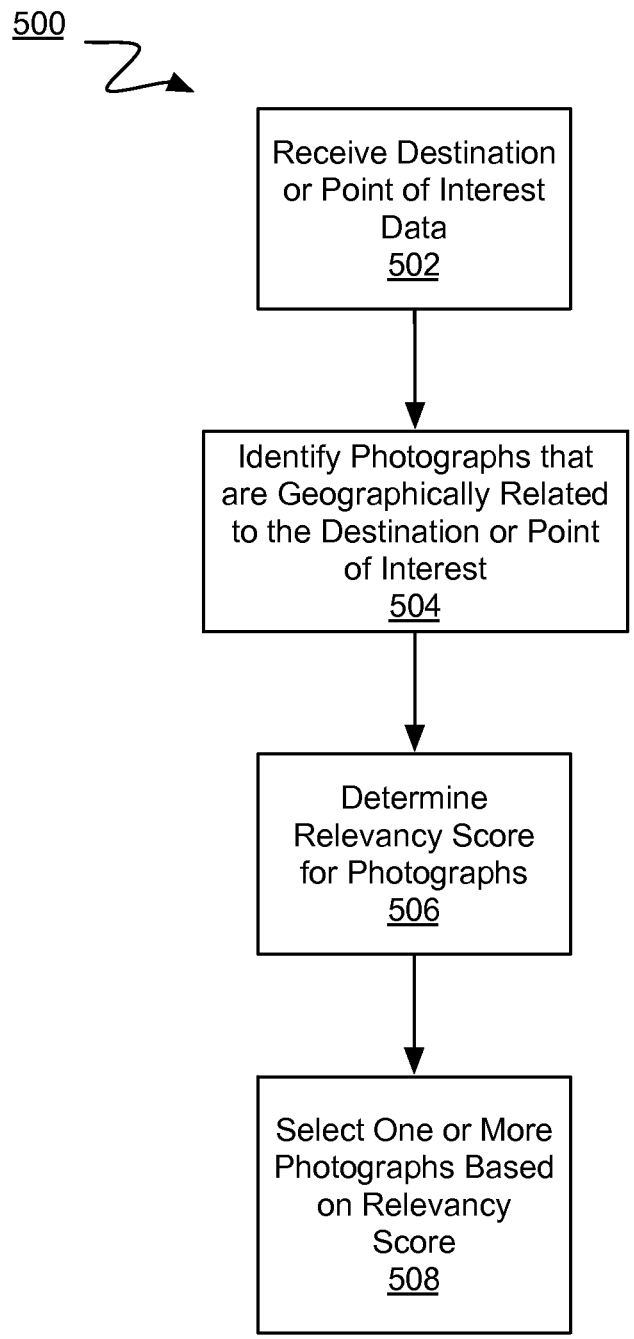
FIG. 5 illustrates an example method for selecting photographs for a destination or point of interest.

FIG. 5 illustrates an example method 500 for selecting photographs for a destination or point of interest. As shown in FIG. 5, the system selects one or more photographs for a destination or point of interest based at least in part on a relevancy score, as described below.

The system receives information about a destination or point of interest (502). The system receives information including a name or identification for the destination or point of interest, or a location or geographic coordinates for the destination or point of interest. In some implementations, the system also receives information about a time of the year. The system can receive information including a date, a range of dates, a month, or a season. In some implementations, the system also receives information about an activity, e.g., a name or identification associated with the activity.

The system identifies multiple photographs that are geographically related to the destination or point of interest (504). In some implementations, the system identifies a photograph as being geographically related to the destination or point of interest by calculating a distance between the location of the destination or the point of interest and the location of the photograph and determining if the distance satisfies a threshold. The threshold can be predefined or variable and can be based at least in part on the category or the size of the destination or point of interest. The system determines the location of the photograph based on the geographic or geo-tag metadata of the photograph obtained from the photograph data store 310.

In some implementations, the system identifies the photographs that are geographically related to the destination or point of interest using non-geographic metadata, e.g., document metadata and topical metadata. Here, the system queries the photograph data store 310 for photographs having non-geographic metadata that references names or identifiers associated with the destination or point of interest. For example, a photograph having a title or surrounding text that mentions the Golden Gate Bridge would be identified as being related to the Golden Gate Bridge. In some implementations, the system queries the photograph data store 310 for photographs having non-geographic metadata that references names or identifiers associated with other destinations or points of interest that are related to the destination or point of interest based at least in part on the logical hierarchy.

In some implementations, the photographs that are geographically related to the destination or point of interest are identified based at least in part on photograph clustering.

Here, the system identifies the photographs based at least in part on non-geographic metadata, as described above. The identified photographs are then clustered by the system based at least in part on their respective geographic metadata. In some implementations, a centroid and radius is calculated for each of the clusters. Subsequently, the system identifies additional photographs by comparing the geographic metadata of the additional photographs with the geographic locations of the clusters. For example, by determining that the additional photographs have a geographic location that is within a cluster as defined by its centroid and radius.

In some implementations, the system identifies multiple photographs that are geographically related to the destination or point of interest and associated with a time of the year. Here, the photographs that are geographically related are identified in any of the ways described above. The photographs that are associated with a time of the year are identified by querying the photograph data store 310 or its indices for photographs with temporal metadata that corresponds to the time of the year. For example the system can query for photographs that have a creation timestamp that falls within a date range associated with the time of the year, e.g., photographs taken in January of any year. In some implementations, the system modifies the time of the year by adding months or days to the time of the year.

The system determines a relevancy score for each of the identified photographs (506). The relevancy score can be based at least in part on one or more criteria, including selection success data and references in documents. The relevancy score can be numeric or nonnumeric and may comprise more than one score or include sub-scores.

In some implementations, the relevancy score is determined based at least in part on selection success data of the photograph. The selection success data is obtained from the photograph data store 310 or another source, e.g., query logs, a social networking data store, or a photograph rating data store. The selection success data can be one or more types, including click through data and explicit user feedback, e.g., photograph ratings, votes, or other indicia of user approval.

In some implementations, a relevancy score of a photograph is determined based at least in part on click through data of the photograph for image search queries that refer to the destination or point of interest. Here, the system determines or obtains how many times a photograph or image was accessed, visited, or clicked on following image queries that include words or phrases relevant to the destination or point of interest, e.g., a name or identifier for the destination or point of interest or names or identifiers for other destinations or points of interest that are related to the destination or point of interest based at least in part on the logical hierarchy. Based at least in part on this, the system determines a relevancy score.

In some implementations, the relevancy score for a photograph is determined based at least in part on explicit feedback, e.g., photograph ratings, votes, or other indicia of user approval. The explicit feedback can be from social networks or photo sharing services, in accordance with user privacy policies and expectations, terms of service, and copyright law. Here, the explicit feedback is obtained from social networks or photo sharing services, for example by identifying social networking or photo sharing pages related to the destination or point of interest or by querying data stores associated with the social networks or photo sharing services. The photograph ratings, votes, or other indicia of user approval can then be used to determine the relevancy score.

In some implementations, the relevancy score is based at least in part on references to the destination or point of interest in documents associated with a photograph. Here, the system identifies electronic documents associated with the photograph, e.g., webpages, social networking pages, or photograph sharing pages. The system determines a document to be associated with the photograph based on one or more criteria, e.g., the document includes the photograph, some portion of the photograph, or a link to the photograph. Documents associated with the photograph can be identified in one or more ways, including performing a computer image recognition or computer vision search, or searching for the name or identification of the photograph in the documents or markup language associated with the documents.

The system determines which of the documents associated with the photograph also reference the destination or point of interest. The system can determine that a document references the destination or point of interest where the document includes terms that are relevant to the destination or point of interest, for example, in the body, the metadata, or the markup language of the document. Relevant terms for the destination or point of interest can be identified, as described above. The system determines the relevancy score based at least in part on the documents that are associated with the photograph and reference the destination or point of interest.

In some implementations, the relevancy score of the photograph is based at least in part on both selection success data and documents associated with the photograph using the methodologies described above.

In some implementations, the relevancy score of the photograph is based at least in part on computer vision or computer visual recognition of an object associated with the destination or point of interest. Here, the system identifies an object associated with the destination or point of interest based at least in part on data in the geographic data store 312 or by querying another data store either internal or external to the system. The system then provides the photograph and the object to a computer vision or computer visual recognition service which returns a response indicating whether the identified object is present in the photograph. The response may include a score e.g., a confidence score that can be used in determining the relevancy score.

In some implementations, the relevancy score of the photograph is determined with regard to an activity. The activity can be identified based at least in part on the received information about the activity. One or more synonyms for the activity can be determined by querying an electronic thesaurus or a synonym data store.

In some implementations, the activity and or its synonyms are used to determine the relevancy score based at least in part on the selection success data. This process is substantially similar to the process for determining the relevancy score based at least in part on selection success data described above. However, here the activity and or its synonyms are used as the identified relevant terms either solely or in conjunction with the identified relevant terms for the destination or point of interest as described above. The same is true for determining the relevancy score based at least in part on documents associated with the point of interest.

The system selects one or more selected photographs from the photographs that are geographically related to the destination or point of interest based at least in part on the respective relevancy scores (508). In some implementations, the photograph or photographs with the best score or scores are selected. Depending on how the relevancy score is determined, the best score may be the highest score or the lowest score. In some implementations, photographs are selected if they satisfy a threshold. The threshold can be predetermined or dynamically determined. Depending on how the relevancy scores are determined, the threshold may be satisfied by scores that are greater than or equal to the threshold or scores that are less than or equal to the threshold. In some instances, more than one of the photographs may satisfy the threshold and thus more than one photograph will be selected. In some instances no photographs may satisfy the threshold, in which case no photographs will be selected. In some implementations, the system sets the threshold at a score corresponding to the score of a particular percentile, e.g., the bottom tenth percentile, for the photographs that are geographically related to the destination or point of interest.

In some implementations, the system selects photographs based at least in part on a visual quality score. The visual quality score can be one or more numeric or nonnumeric scores or measures. The visual quality score is determined based at least in part on one or more criteria e.g., exposure, color or saturation, clarity, photographer, camera, or user feedback. Exposure, color or saturation, and clarity scores or ratings are determined using established algorithms. In some implementations, the photographer rating is obtained, for example from the photographer metadata in photograph data store 312. In some implementations the photograph rating is calculated based on exposure, color or saturation, or clarity scores or ratings for some or all the photographs by the photographer according to photographer metadata in the photograph data store 312. The camera rating can be determined based at least in part on camera metadata in the photograph data store 312 or by calculating aggregated or combined exposure, color or saturation, or clarity scores or ratings for some or all the photographs taken by the camera according to camera metadata in the photograph data store 312.

The system can combine that visual quality score with the relevancy score and can be used to select one or more photographs. Additionally, the visual quality score can be separate from the relevancy score. Photographs can be selected where their visual quality score satisfies a threshold as described above.

In some implementations, example method 500 is performed where the destination is a city. Here, the system receives data indicative of a city and identifies photographs that are geographically related to the city. For each of the photographs, the system determines a relevancy score based at least in part on selection success data of the photograph for image queries referring to the city and references to the city in documents associated with the photograph. The system then selects one or more selected photographs from the photographs based at least in part on a respective visual quality score and the respective relevancy scores.

Figure 6:
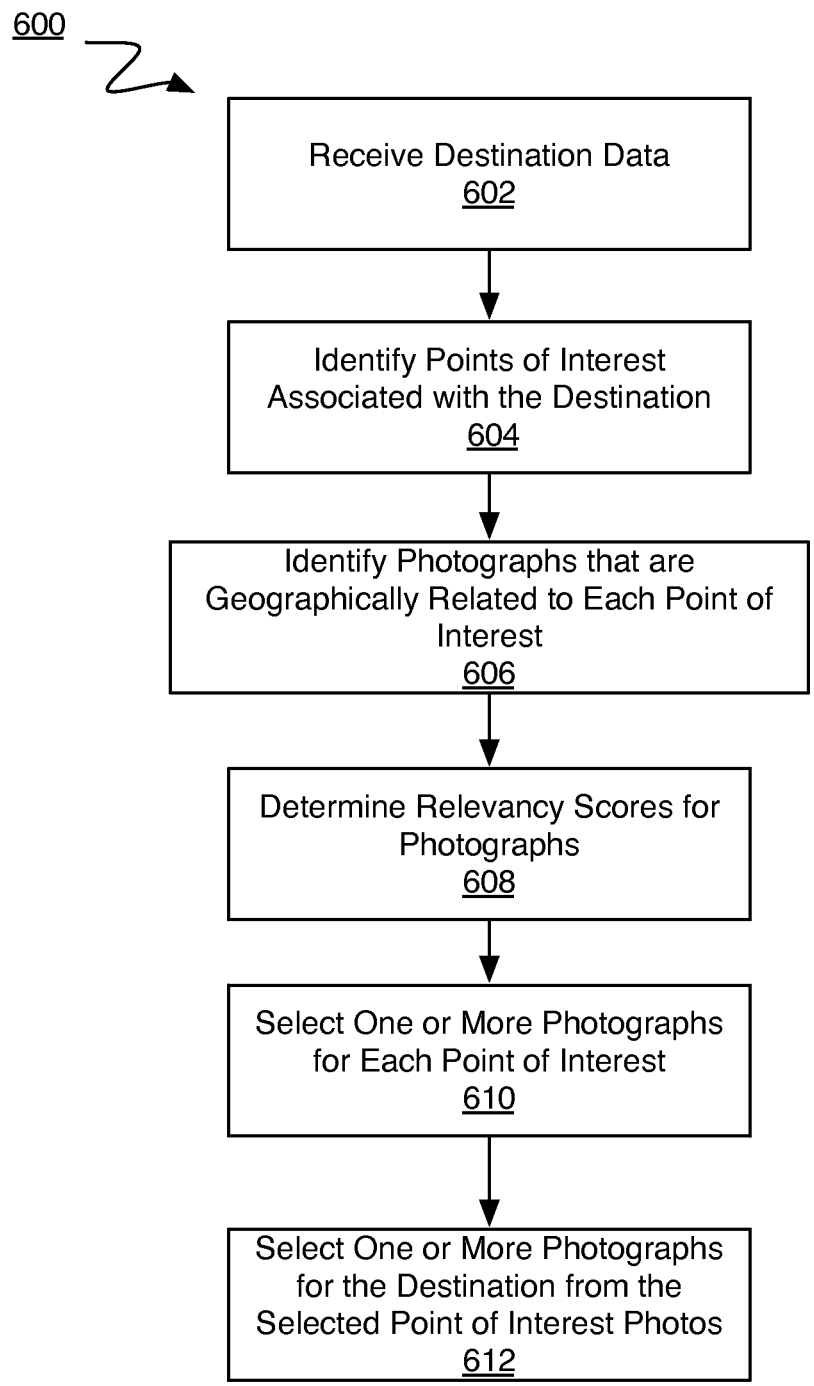
FIG. 6 illustrates an example method for selecting photographs for a destination.

FIG. 6 illustrates an example method 600 for selecting photographs for a destination. As shown in FIG. 6, the system selects photographs for a destination by selecting photographs for points of interest associated with the destination.

The system receives information about a destination (602) as described above with reference to FIG. 5.

The system identifies multiple of points of interest associated with the destination by querying the geographic data store 312 (604). The details of this step are described below with reference to FIG. 7.

The photo selection process as described above with reference to FIG. 5 is performed for each of the identified points of interest associated with the destination (606-610). The result is one or more selected point of interest photographs for at least some of the identified points of interest.

From this result, one or more destination photographs are selected (612). The system selects one or more selected destination photographs based at least in part on the respective relevancy scores and or the respective visual quality scores for the selected point of interest photographs as described above with reference to FIG. 5. In some implementations, the selection of the one or more selected destination photographs can be based at least in part on a popularity score for the respective associated points of interest. Determination of the popularity score is described with reference to FIG. 7. Here, the system can consider the relevancy score and or the visual quality score for a selected point of interest photograph as well as the popularity score for the associated point of interest when selecting the selected point of interest photograph as a selected destination photograph.

In some implementations, the system can require that the popularity score, relevancy score, visual quality score, or a combination of any of the three satisfy a threshold. The threshold can be determined dynamically and can be based at least in part on some or all of the identified or selected point of interest photographs. For example, the system could dynamically set the threshold at a score corresponding to the score of the bottom tenth percentile for the identified point of interest photographs.

Note that the term point of interest photograph has no special meaning other than to identify that the photograph was selected for a point of interest. Similarly the term destination photograph has no special meaning other than to identify that the photograph was selected for a destination.

In some implementations, example method 600 is combined with example method 500. Here a first set of selected photographs are selected for the destination using example method 500 and a second set of selected photographs are selected for the destination using example method 600. The system then selects one or more selected destination photographs from the two sets. The selection is based at least in part on one or more criteria, including the respective relevancy scores, visual quality scores, or popularity scores. In some implementations, the system can require that the popularity score, relevancy score, visual quality score, or a combination of any of the three satisfy a threshold. The threshold can be determined dynamically and can be based at least in part on some or all of the identified or selected point of interest or destination photographs. For example, the system could dynamically set the threshold at a score corresponding to the score of the bottom tenth percentile for the identified point of interest photographs and destination photographs.

Figure 7:
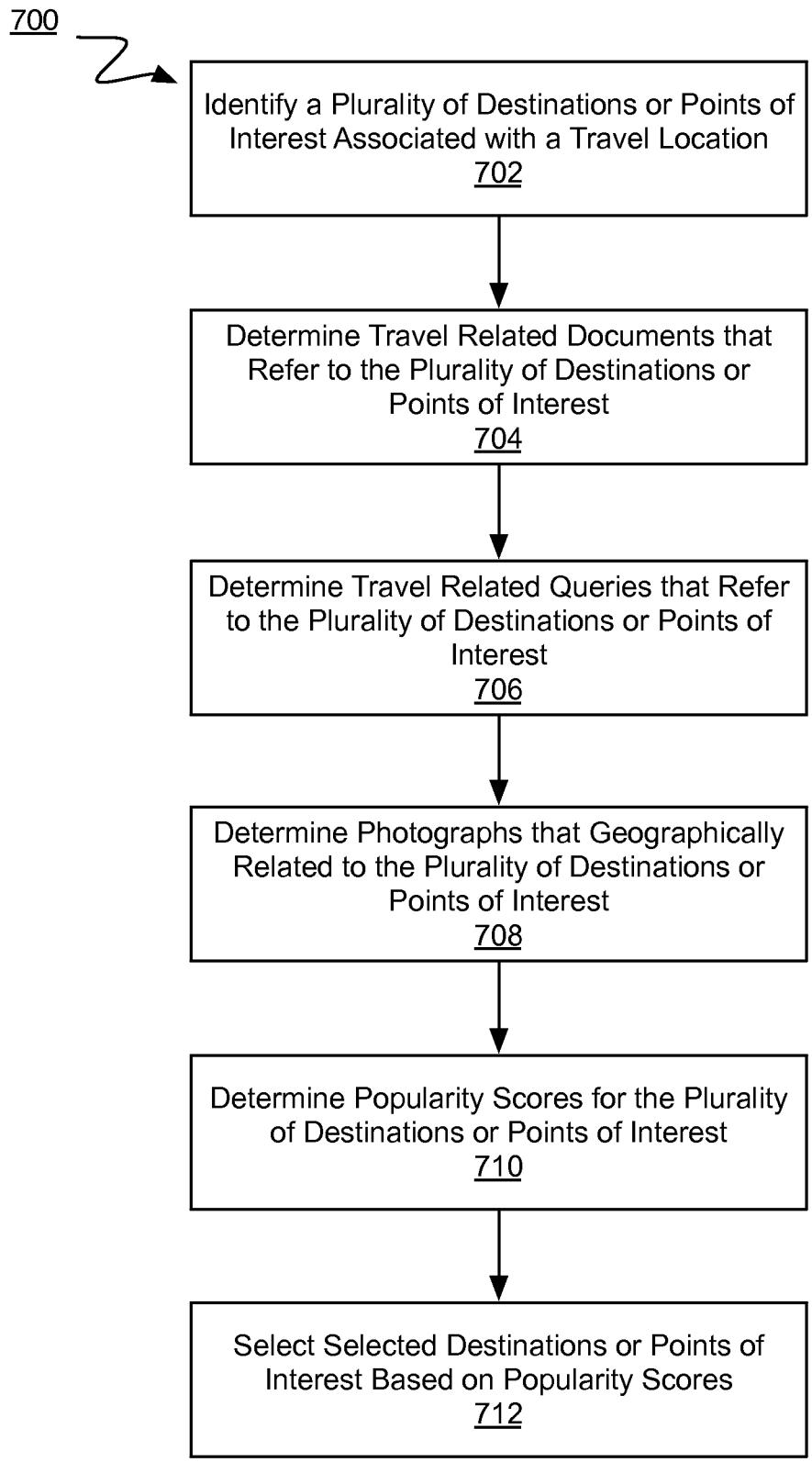
FIG. 7 illustrates an example method for selecting a destination or point of interest.

FIG. 7 illustrates an example method 700 for selecting a destination or point of interest. As shown in FIG. 7, one or more destinations or points of interest are selected for a travel location based at least in part on a popularity score, as described below.

The system identifies multiple destinations or points of interest associated with a travel location (702). The travel location can take one or more forms, including, a name or identifier associated with a geographic location or a destination or a point of interest, a single set of geographic coordinates, or multiple sets of geographic coordinates corresponding to a shape.

In some implementations, the destinations or points of interest associated with the travel location are identified by geographic location based on data mapping travel locations to destinations or points of interest. The travel location or location data derived from the travel location is used to query the geographic data store 312. The system identifies a destination or point of interest from geographic data store 312 by calculating a distance between a location of the destination or the point of interest and the travel location. Where the calculated distance satisfies a threshold, the system identifies the destination or point of interest as being associated with the travel location. The threshold can be satisfied as described above.

In some implementations, the destinations or points of interest associated with the travel location are identified using data mapping travel locations to destinations or points of interest based at least in part on matching or the logical hierarchy. The travel location or location data derived from the travel location is used to query the geographic data store 312 to identify one or more destinations or points of interest that match the travel location. Matching can be based at least in part on comparing names, identifiers, or geographic coordinates for the travel location with those for the destinations or points of interest. Additionally in some implementations, the system identifies additional destinations or points of interest using the logical hierarchy by selecting destinations or points of interest that are related in the logical hierarchy to the destinations or points of interest that match the travel location. For example, where the travel location is California the matching destination could be California. Using the logical hierarchy, additional destinations could be identified that are within California, e.g., San Francisco, Los Angeles, or San Diego. Additionally, the system can choose to identify only destinations, only points of interests, or a combination of the two. In some implementations, the matching and hierarchical identification approaches disclosed here are combined with the geographic location approach disclosed above.

The system determines a popularity score for each of the destinations or points of interest that are associated with a travel location (710). The system determines the popularity score based at least in part on one or more criteria, including travel related documents that refer to the destination or point of interest, travel related queries that refer to the destination or point of interest, or photographs that are geographically related to the destination or point of interest. The popularity score, as determined by the system, can be numeric or nonnumeric and may comprise more than one score or include sub-scores.

In some implementations, the popularity score is determined based at least in part on determining travel related documents that refer to the destination or point of interest (704). The system determines the travel related documents from one or more types of documents, including web pages, social networking pages, photo sharing pages, word processing documents, presentations, or books. The system classifies documents as travel related documents based at least in part on one or more criteria including, usage of travel related terms in the text, title, header, URL, metadata, or markup language of the document, or being from a travel related source based at least in part on a list of travel related sources. The system accesses the travel related documents in one or more ways, including by querying a travel document data store, or obtaining results from a document or Internet search with travel related terms. The system determines that the travel related documents refer to the destination or point of interest, e.g., by identifying a reference to a name or identifier of the destination or point of interest in text, title, header, URL, metadata, or markup language of the travel related document.

The system then determines a popularity score for a destination or point of interest based at least in part on the travel related documents that refer to the destination or point of interest. The popularity score is determined in one or more ways, including determining a count for the number of travel related documents or the number of references to the destination or point of interest in the travel related documents. Optionally, the count can be weighted based at least in part on the quantity or quality of the references to the destination or point of interest in the respective travel related documents. Optionally, the count can be weighted based at least in part on the source of the travel related documents. Optionally, the system compares the travel related documents and removes duplicates. Optionally, the system analyzes the travel documents and removes those that appear to be spam. Additionally, the count can be modified using one or more mathematical operators to adjust the distribution of counts or to coerce counts into a range.

In some implementations, the popularity score is determined based at least in part on determining travel related documents that refer to the destination or point of interest as well as an activity. This approach is similar to the approach for determining a popularity score based at least in part on travel related documents described above, with the addition that the travel related documents also refer to the activity. Here, the travel related documents are determined to refer to the activity based at least in part on, e.g., references to the activity or its synonyms in text, title, header, URL, metadata, or markup language of the travel related document.

In some implementations, the popularity score is determined based at least in part on determining travel related queries that refer to the destination or point of interest (706). The system classifies a query as a travel related query based at least in part on one or more criteria including, determining that the query was for or directed to a travel search engine, the query includes one or more travel related terms, or the query includes terms associated with a geographic location that is greater than a threshold distance away from a location of an I.P. address associated with the query. The system determines that the travel related queries refer to the destination or point of interest based at least in part on the inclusion of terms that are relevant to the destination or point of interest, e.g., names or identifiers for the destination or point of interest or other destinations or points of interest that are related to the destination or point of interest based at least in part on the logical hierarchy.

The system then determines the popularity score for a destination or point of interest in one or more ways, including determining a count for the number of travel related queries or the number of references to the destination or point of interest in the travel related queries. Optionally, the count can be weighted based at least in part on the quantity or quality of the references to the destination or point of interest in the respective travel related queries. Additionally, the count can be modified using one or more mathematical operators to adjust the distribution of counts or to coerce counts into a range.

In some implementations, the popularity score is determined based at least in part on travel related queries that refer to the destination or point of interest as well as an activity. This approach is similar to the approach for determining a popularity score based at least in part on travel related queries described above, with the addition that the travel related queries also refer to the activity. Here, the travel related queries are determined to refer to the activity based at least in part on the inclusion of one or more terms that reference the activity or its synonyms.

In some implementations, the popularity score is determined based at least in part on a combined query distance for the travel related queries that refer to the destination or point of interest. The query distance for each travel related query is determined by calculating, the distance between a location associated with the travel related query and the location of the destination or point of interest. A location associated with the travel related query can be determined in one or more ways, including resolving an IP address associated with the query. The query distances for the travel related queries are then combined using one or more mathematical operators. For example, the combined query distance can be the average or the total of the query distances.

In some implementations, the popularity score is determined based at least in part on identifying photographs that are geographically related to the destination or point of interest (708). Photographs that are geographically related to the destination or point of interest are identified as described above with regard to FIGS. 5-6.

The system then determines the popularity score for the destination or point of interest based at least in part on the photographs that are geographically related to the destination or point of interest. In some instances, the popularity score is determined based at least in part on a count of the number of photographs that are geographically related to the destination or point of interest. Optionally, the count can be weighted based at least in part on the respective distances between the locations associated with the photographs and the location of the destination or point of interest. Additionally, the count may be modified using one or more mathematical operators to adjust the distribution of counts or to coerce the count into a range.

In some implementations, the popularity score is determined based at least in part on two or more of the approaches described above, including determining travel related documents, determining travel related queries, determining combined query distances, or identifying photographs. Here, the popularity score is determined in one or more ways, including combining the respective popularity scores for each of the approaches by applying one or more mathematical operators or formulas.

In some implementations, the popularity score for a destination is determined based at least in part on the popularity scores for other destinations or points of interest that are related to the destination according to the logical hierarchy. Here, other destinations or points of interest that are related to the destination are identified using the logical hierarchy as described above with reference to FIGS. 3 and 7. For each of the identified other destinations or points of interest, a popularity score is determined using one or more of the approaches described above. The popularity scores for the other destinations or points of interest can be combined by applying one or more mathematical operators or formulas. Additionally, a popularity score for the destination can be determined using one or more of the approaches described above. The combined popularity score for the other destinations or points of interest can be combined with the popularity score for the destination by applying one or more mathematical operators or formulas.

The system selects one or more selected destinations or points of interest from the identified destinations or points of interest based at least in part on the respective popularity scores (712). In some implementations, the destinations or points of interest with the best score or scores are selected. Depending on how the popularity score is determined, the best score may be the highest score or the lowest score. In some implementations, destinations or points of interest are selected if they satisfy a threshold as described above.

In some implementations, the destinations are cities. Here, cities associated with a travel location are identified by querying the geographic data store 312. For each of the cities the system determines: a count of travel related documents that refer to the city, a count of travel related queries that refer to the city, a count of photographs from the photograph data store 310 that are geographically related to the city, and a popularity score based at least in part on the count of travel documents, the count of travel queries, and the count of photographs. The system then selects one or more selected cities based at least in part on the respective popularity scores.

Figure 8:
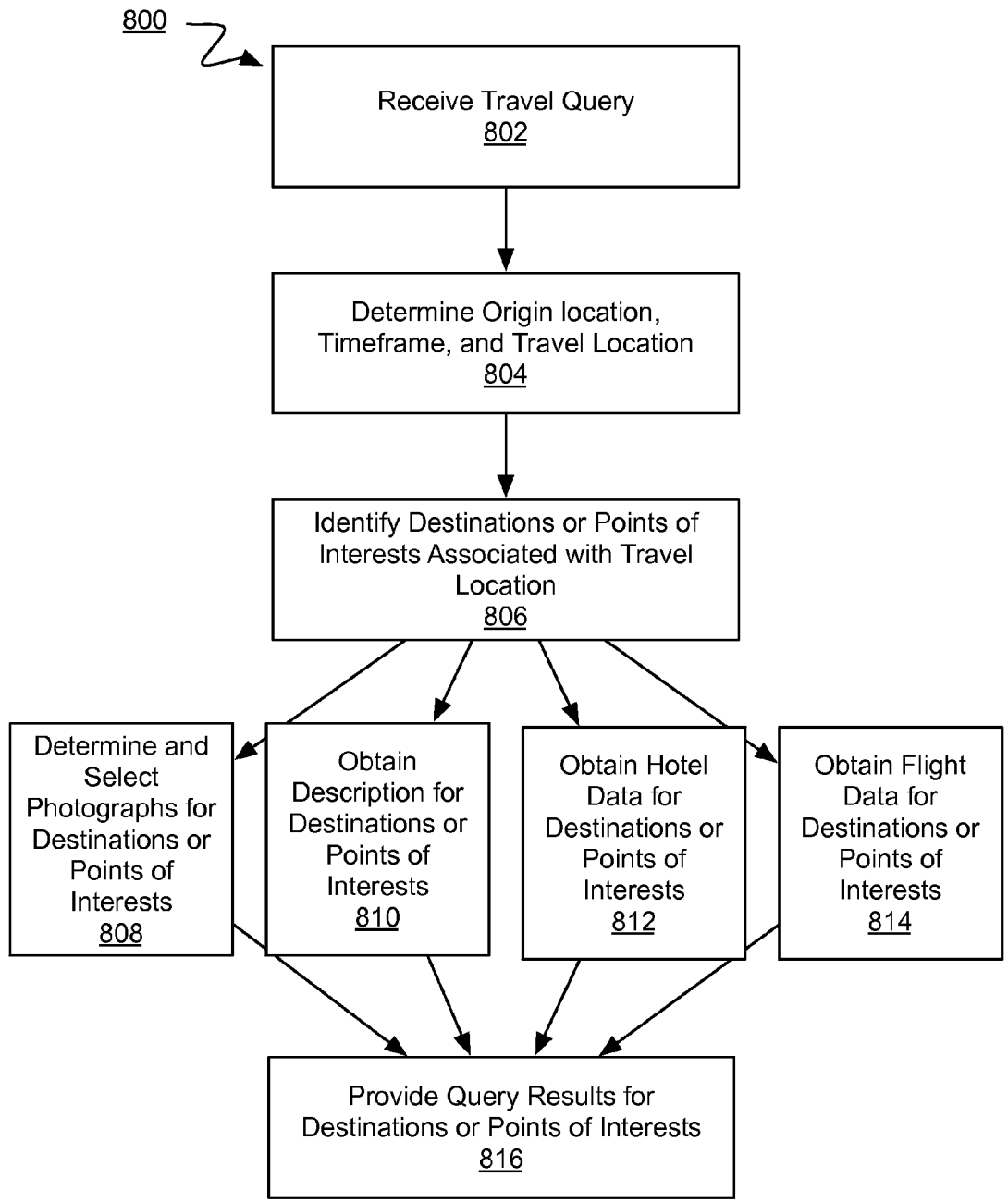
FIG. 8 illustrates an example method for providing travel query results.

FIG. 8 illustrates an example method 800 for providing travel query results 120. As shown in FIG. 8, the system provides travel query results 120 for one or more destinations or points of interest that are identified based at least in part on a travel query 116.

The system receives a travel query 116 as described above with reference to FIG. 1 (802).

The system determines one or more terms or parameters from the travel query 116 (804). The terms or parameters can include: an origin location, a travel location, a timeframe, an activity, flight preferences, hotel preferences, or pricing preferences. The origin location defines a geographical location for travel to originate. For example, the origin location can be any city or airport from which travel can originate. The travel location defines a geographical location that the user intends to travel to or visit. The timeframe defines a period of time for which travel is to occur. The timeframe can be a single date or time, a range of dates or times, a month, a season, or a combination of any of these. Additionally, the timeframe can be flexible or fixed. The activity defines something the user intends to do while traveling, for example snorkeling. The flight preferences define one or more options related to air travel, for example first class or nonstop. The hotel preferences define one or more options relating to lodging, for example a star rating or the presence of a pool. The pricing preferences define one or more options relating to cost, for example total trip cost, hotel cost, or airfare cost. The terms or parameters can be determined based at least in part on the metadata of the travel query 116.

The system identifies multiple destinations or points of interest associated with the travel location (806). The destinations or points of interest are identified using one or more of the approaches disclosed above with reference to FIG. 7. The identification of the destinations or points of interest can occur either in anticipation of the travel query 116 or in response to the travel query 116.

In some implementations, the system selects a subset of the identified destinations or points of interest based at least in part on a popularity score. The selection can be performed using one or more of the approaches disclosed with reference to FIG. 7, including selecting the destinations or points of interest having the best score or those that satisfy a threshold.

The system determines multiple photographs for each of the identified destinations or points of interest. The photographs are determined using one or more of the approaches disclosed above with reference to FIGS. 5-6. The determination of the photographs can occur either in anticipation of the travel query 116 or in response to the travel query 116.

The system selects one or more selected photographs for each of the identified destinations or points of interest (808). The one or more selected photographs are determined using one or more of the approaches disclosed above in reference to FIGS. 5-6. The selection of the one or more selected photographs can occur either in anticipation of the travel query 116 or in response to the travel query 116.

In some implementations, the system obtains a description associated with a destination or point of interest for each of the identified destinations or points of interest (810). The system obtains the descriptions, including text, images, links, or videos, from the geographic data store 312 or another data store. In some implementations, the description is obtained by crawling or requesting webpages, for example from an open source online encyclopedia. The obtaining of the descriptions can occur either in anticipation of the travel query 116 or in response to the travel query 116.

In some implementations, the system obtains hotel data regarding one or more hotels (812), for example hotel prices. The system obtains the hotel data, including titles, descriptions, photographs, star ratings, cost, availability, user ratings, or locations, by request from the hotel module 210, or a hotel search engine. The request for hotel data can include the travel location, the timeframe, the hotel preferences, or the pricing preferences as determined from the travel query 116. The obtaining of the hotel data can occur either in anticipation of the travel query 116 or in response to the travel query 116.

In some implementations, the system obtains flight data regarding one or more flights (814), for example flight prices. The system obtains the flight data, including flight numbers, descriptions, images, routing information, availability, prices, times, dates, or airlines, by request, from the flight module 212 or a flight search engine. The request for flight data can include the origin location, the travel location, the timeframe, the flight preferences, or the pricing preferences as determined from the travel query 116. The obtaining of the flight data can occur either in anticipation of the travel query 116 or in response to the travel query 116.

The system provides one or more travel query results 120 for the identified destinations or points of interest as described above with reference to FIGS. 1-2. The system provides query results in accordance with user privacy policies and expectations and copyright law. In some implementations, the system provides travel query results 120 that include one or more of the respective selected photographs for the identified destinations or points of interest. In some implementations, the system provides travel query results 120 that include the respective descriptions for the identified of destinations or points of interest. In some implementations, the system provides travel query results 120 that include the respective hotel data for the identified destinations or points of interest. The hotel data provided in the travel query results 120 can be a selected subset of the hotel data. For example, in some instances only the cost for the cheapest hotel is provided. The selection of the subset of the hotel data can be based at least in part on any of the relevant terms in the travel query 116.

In some implementations, the travel query results 120 include respective flight data for each of the destinations or points of interest. The flight data provided in the travel query results 120 can be a selected subset of the flight data. For example in some instances only the cost for the cheapest flight is provided. The selection of the subset of the flight data can be based at least in part on any of the relevant terms in the travel query 116.

In some implementations, the system only provides query results for a subset of the identified destinations or points of interest determined based at least in part on respective popularity scores. The respective popularity scores are determined using one or more of the approaches disclosed above in reference to FIG. 7. Selection of the subset of the identified destinations or points of interest can be performed using one or more of the approaches disclosed above with reference to FIG. 7.

In some implementations, the system ranks the query results based at least in part on the respective popularity scores for the identified destinations or points of interest. Popularity scores can be determined using one or more of the approaches disclosed above in reference to FIG. 7. The system can rank the query results from highest popularity score to lowest popularity score or vice versa.

In some implementations, the destinations are cities. Here, for example the system receives a travel query 116 and determines an origin location, a time frame, and a travel location based at least in part on the travel query 116. The system then identifies cities associated with a travel location by querying the geographic data store 312. For each of the cities the system: determines a photographs that are geographically related to the city, selects a selected photograph from the photographs, obtains a description associated with the city, obtains a hotel price associated with the city and with the time frame, and obtains a flight price for a flight corresponding to the origin location, the city, and the time frame. The system then provides travel query results 120, including the respective selected photograph, the respective description, the respective hotel price, and the respective flight price for each of the cities.

Figure 9:
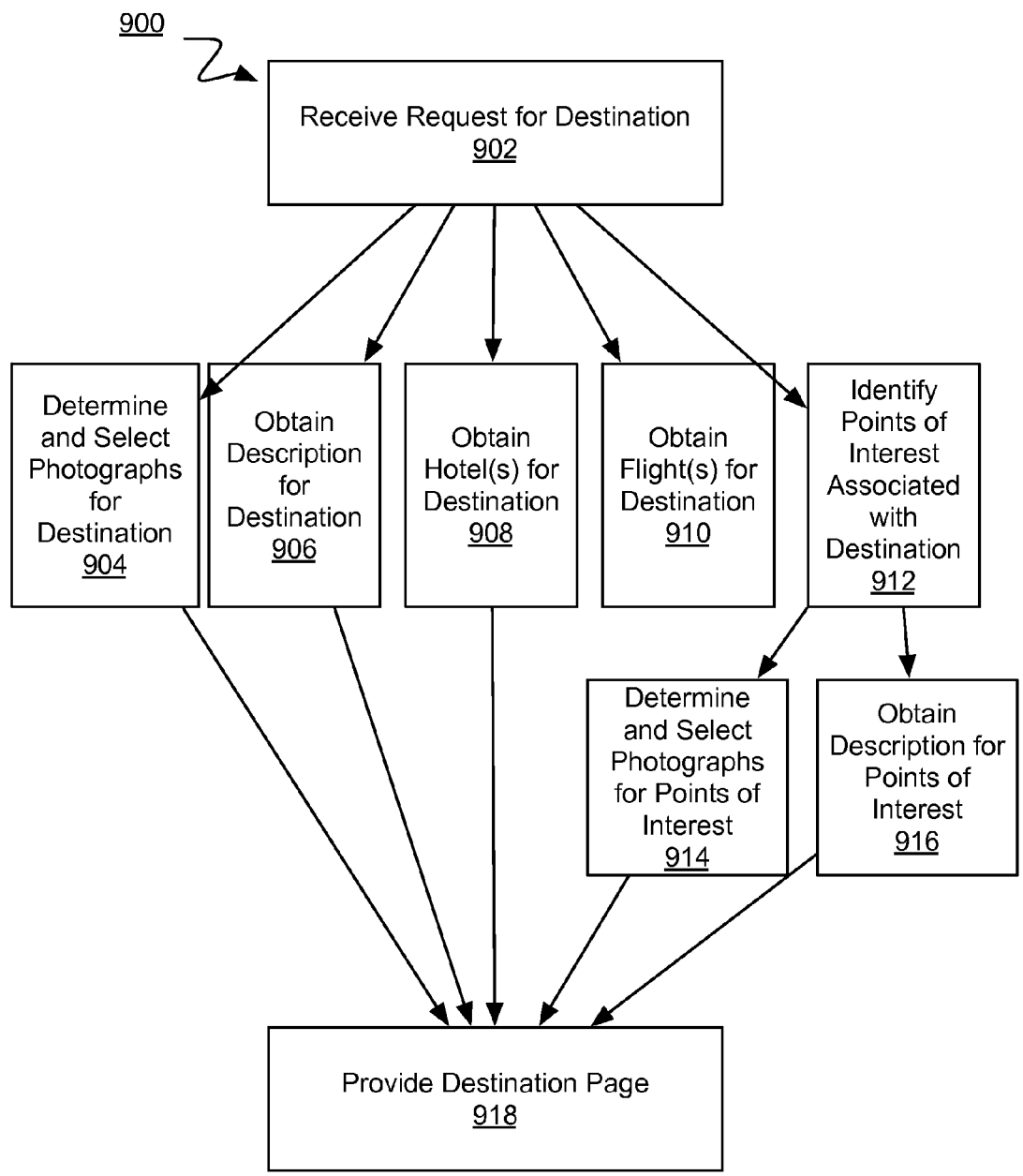
FIG. 9 illustrates an example method for providing a destination page.

FIG. 9 illustrates an example method 900 for providing a destination page. As shown in FIG. 9, a destination page is provided for a request.

The system receives a request for a destination (902). In some implementations, the system identifies the destination based on an identifier of the destination included in the request, for example a name, an identification code, or geographic coordinates.

The system identifies destination photographs that are geographically related to the destination (904). The destination photographs are identified using one or more of the approaches or implementations described above with reference to FIGS. 5-6.

The system selects a selected destination photograph for the destination from the destination photographs (904). The selected destination photograph for the destination is selected using one or more of the approaches or implementations described above with reference to FIGS. 5-6.

The system obtains a destination description associated with the destination (906). The destination description associated with the destination is obtained using one or more of the approaches or implementations described above with respect to FIG. 8.

The system obtains hotel data associated with the destination (908). The hotel data is obtained using one or more of the approaches or implementations described above with reference to FIG. 8.

The system obtains flight data associated with the destination (910). The flight dated is obtained using one or more of the approaches or implementations described above with reference to FIG. 8.

The system identifies points of interest associated with the destination (912). The points of interest are identified using one or more of the approaches or implementations described above with reference to FIG. 7.

For each of the identified points of interest, the system identifies point of interest photographs that are geographically related to the point of interest (914). The point of interest photographs are identified using one or more of the approaches or implementations described above with reference to FIG. 5.

For each of the identified points of interest, the system selects a selected point of interest photograph from the respective point of interest photographs (914). The selected point of interest photographs are selected using one or more of the approaches described above with reference to FIG. 5.

For each of the identified points of interest, the system obtains a point of interest description (916). The respective point of interest descriptions are obtained using one or more of the approaches or implementations described above with reference to FIG. 8.

The system provides a destination page (918). The system provides the destination page in accordance with user privacy policies and expectations and copyright law. The destination page includes the selected destination photograph, some or all of the hotel data, some or all the flight data, the destination description, the selected point of interest photographs, and the selected point of interest descriptions. The page can be provided in one or more formats, for example HTML or XML. The page can be provided such that it includes commands directing how it should be displayed or rendered on a user device 105, including Cascading Style Sheets (CSS) language or JavaScript language commands. The page can be provided such that it is optimized or designed for a particular device, operating system, screen size, or resolution, for example, as an application running on the desktop or mobile operating system or as a webpage running on a browser. The page can be generated either in anticipation of the request or in response to the request.

In some implementations, the system provides hotel data for one or more hotels, including titles, descriptions, photographs, star ratings, cost, availability, user ratings, or locations. The system can select to provide hotel data for a subset of the hotels based at least in part on one or more criteria, e.g., price, location, star rating, or user rating.

In some implementations, the system provides flight data for one or more flights, for example flight numbers, descriptions, images, routing information, availability, prices, times, dates, or airlines. The system can select to provide flight data for a subset of the flights based at least in part on one or more criteria, e.g., price or time.

Note that in describing FIG. 9, descriptions and photographs are referred to as point of interest descriptions, destination descriptions, point of interest photographs, and destination photographs. Here the use of destination or point of interest before descriptions or photographs has no special meaning and is merely used as an identifier to aid the reader.

Figure 10:
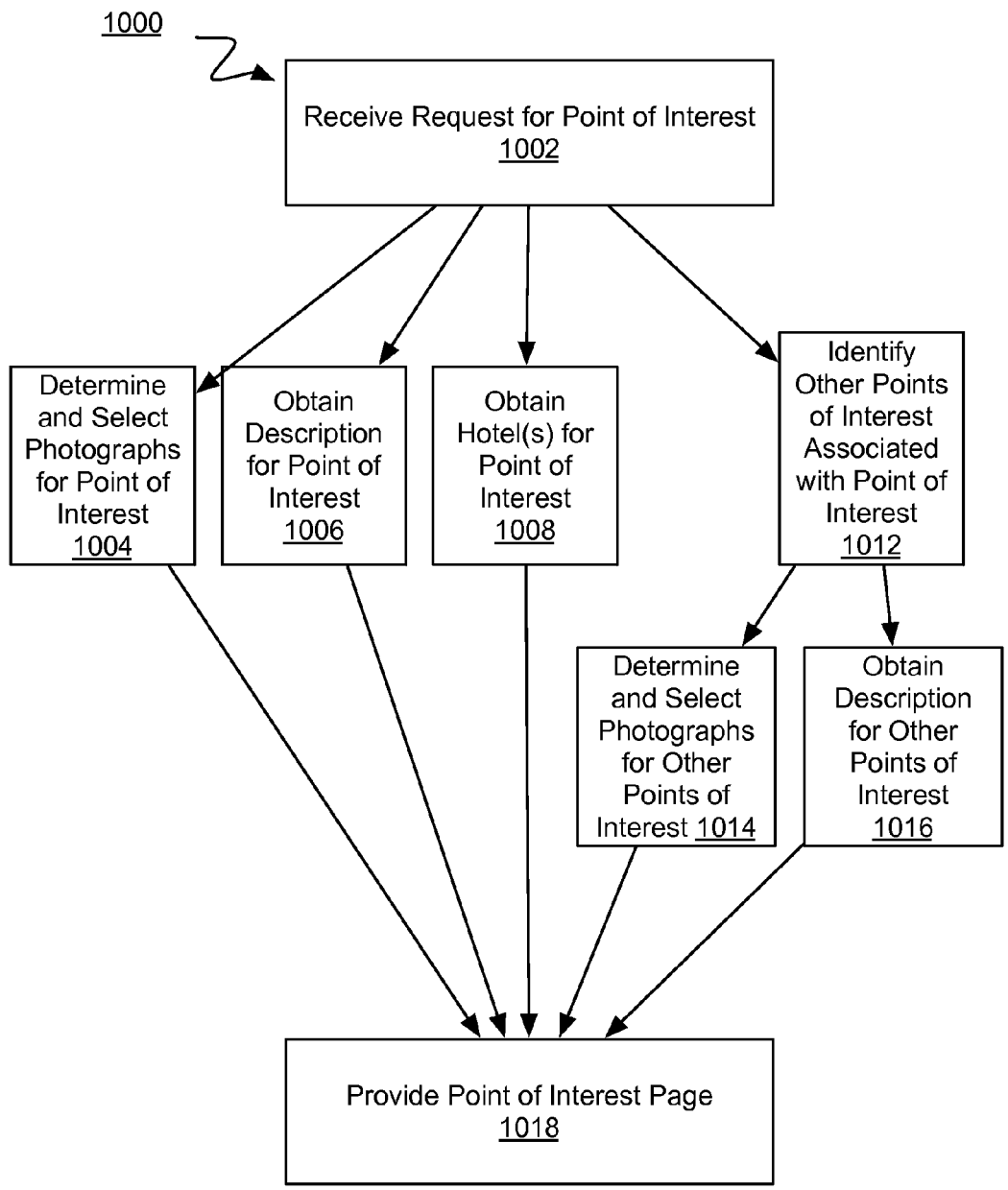
FIG. 10 illustrates an example method for providing a point of interest page.

FIG. 10 illustrates an example method 1000 for providing a point of interest page. As shown in FIG. 10, the system provides a point of interest page for a request.

The system receives a request for a point of interest (1002). In some implementations, the system identifies the point of interest based on an identifier of a point of interest included in the request, for example a name, an identification code, or geographic coordinates.

The system identifies photographs that are geographically related to the point of interest (1004). The photographs are identified using one or more of the approaches or implementations described above with reference to FIG. 5.

The system selects a selected photograph for the point of interest from the identified photographs (1004). The selected photograph for the point of interest is selected using one or more of the approaches or implementations described above with reference to FIG. 5.

The system obtains a description associated with the point of interest (1006). The description associated with the point of interest is obtained using one or more of the approaches or implementations described above with reference to FIG. 8.

The system obtains hotel data associated with the point of interest (1008). The hotel data is obtained using one or more of the approaches or implementations described above with reference to FIG. 8.

The system identifies other points of interest associated with the point of interest (1012). The other points of interest are identified using one or more of the approaches or implementations described above with reference to FIGS. 7-8.

For each of the identified other points of interest, the system identifies other point of interest photographs that are geographically related to the other point of interest (1014). The respective other point of interest photographs are identified using one or more of the approaches or implementations described above with reference to FIG. 5.

For each of the identified other points of interest, the system selects a selected other point of interest photograph from the respective other point of interest photographs (1014). The selected other point of interest photographs are selected using one or more of the approaches described above with reference to FIG. 5.

For each of the identified points of interest, the system obtains an other point of interest description (1016). The respective other point of interest descriptions are obtained using one or more of the approaches or implementations described above with reference to FIG. 8.

The system provides a point of interest page (1018). The system provides the point of interest page in accordance with user privacy policies and expectations and copyright law. The point of interest page includes the selected photograph, some or all of the hotel data, the description, the selected other point of interest photographs, and the selected other point of interest descriptions. The page can be in one or more formats, include commands, or optimized as described above with reference to FIG. 9. The page can be generated either in anticipation of the request or in response to the request. In some implementations, some or all of the hotel data is provided as described above with reference to FIG. 9.

Figure 11:
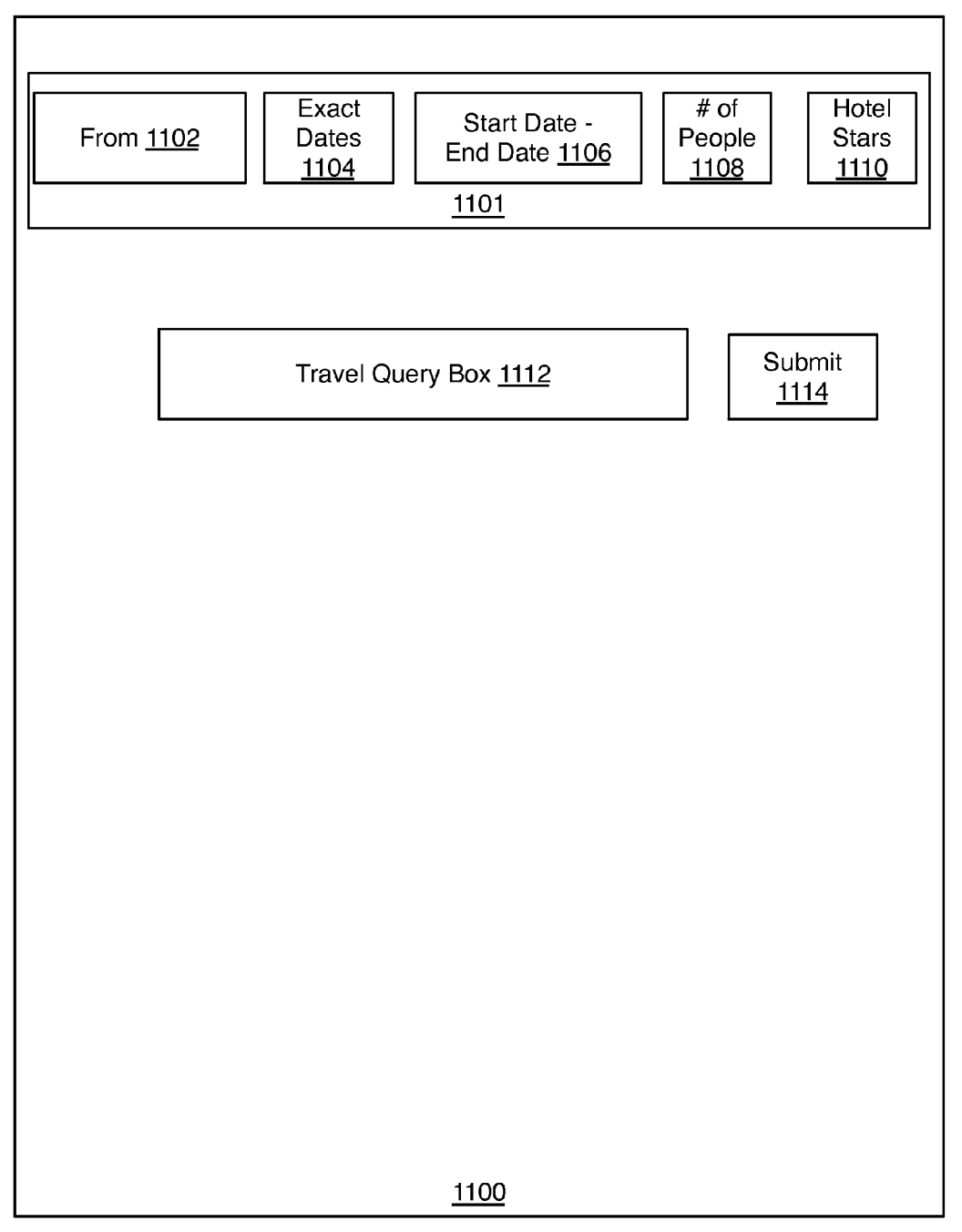

FIG. 11 illustrates an example travel search engine interface 1100 for a travel search engine. The travel search engine interface 1100 can be implemented in one or more formats or languages, for example HTML, Flash, or XML. It can include commands directing how it should be displayed or rendered on a user device, including CSS or JavaScript commands. The travel search engine interface 1100 can be instantiated in versions optimized or designed for a particular device, operating system, screen size, or resolution, for example, as an application running on a desktop or mobile operating system or as a webpage running on a browser.

The travel search engine interface 1100 includes a travel query option section 1101. The travel query option section 1101 can take one or more forms, for example as a bar extending across the top portion of the travel search engine interface 1100. The travel query option section 1101 has a number of fields including a from field 1102, a start date-end date field 1106, a number of people field 1108, and a hotel stars field 1110. The fields may be arranged in any order, linearly, horizontally, or in a grid. The data entered in the travel query option section 1101 is submitted as part of a travel query.

The from field 1102 is a field that allows a user to specify where travel is to originate from. In some implementations, the from field is a drop-down, for example as a list of cities or airports. In some implementations, the from field is a text box, for example a box allowing free text entry that auto completes with a city or airport as the user types. The from field is associated with the origin location of a travel query as described above.

Start date-end date field 1106 is a field that allows a user to specify the time period for travel. In some implementations, the start date-end date field 1106 has two subfields, one for start date and one for end date, for example two fields each with a drop-down for month, day, and year. In some implementations, the start date-end date field 1106 displays a calendar that allows the user to select a start and end date on the calendar. The start date-end date field 1106 is associated with the timeframe of the travel query as described above.

The number of people field 1108 is a field that allows a user to specify the number of travelers. In some implementations, the number of people field 1108 is a drop-down. In some implementations, the number of people field 1108 is a text box.

The hotel stars field 1110 is a field allows a user to specify a hotel stars preference. In some implementations, the hotel stars field 1110 is a drop-down. In some implementations, the hotel stars field 1110 is a text box. The hotel stars field 1110 is associated with hotel preferences of the travel query as discussed above.

In some implementations, the travel query options section 1101 includes an exact dates field 1104. The exact dates field 1104 is a field that allows a user to indicate whether the travel time period is flexible. In some implementations, the exact dates field 1104 is a checkbox or radio button. In some implementations, the exact dates field 1104 is a drop-down or text box that allows a user to enter how many days should be added to and or subtracted from the travel period.

The travel search engine interface 1100 includes a travel query box field 1112. The travel query box field 1112 is a field that allows a user to enter a desired travel location, for example a destination or point of interest. The query box 1112 accepts queries in one or more forms, for example text queries, audio queries, natural language queries, or structured queries. In some implementations, the query box 1112 accepts queries including an activity, for example "snorkeling in Asia." The travel query box field 1112 is associated with the travel location of a travel query and in some cases with the activity of a travel query as discussed above.

Figure 12:
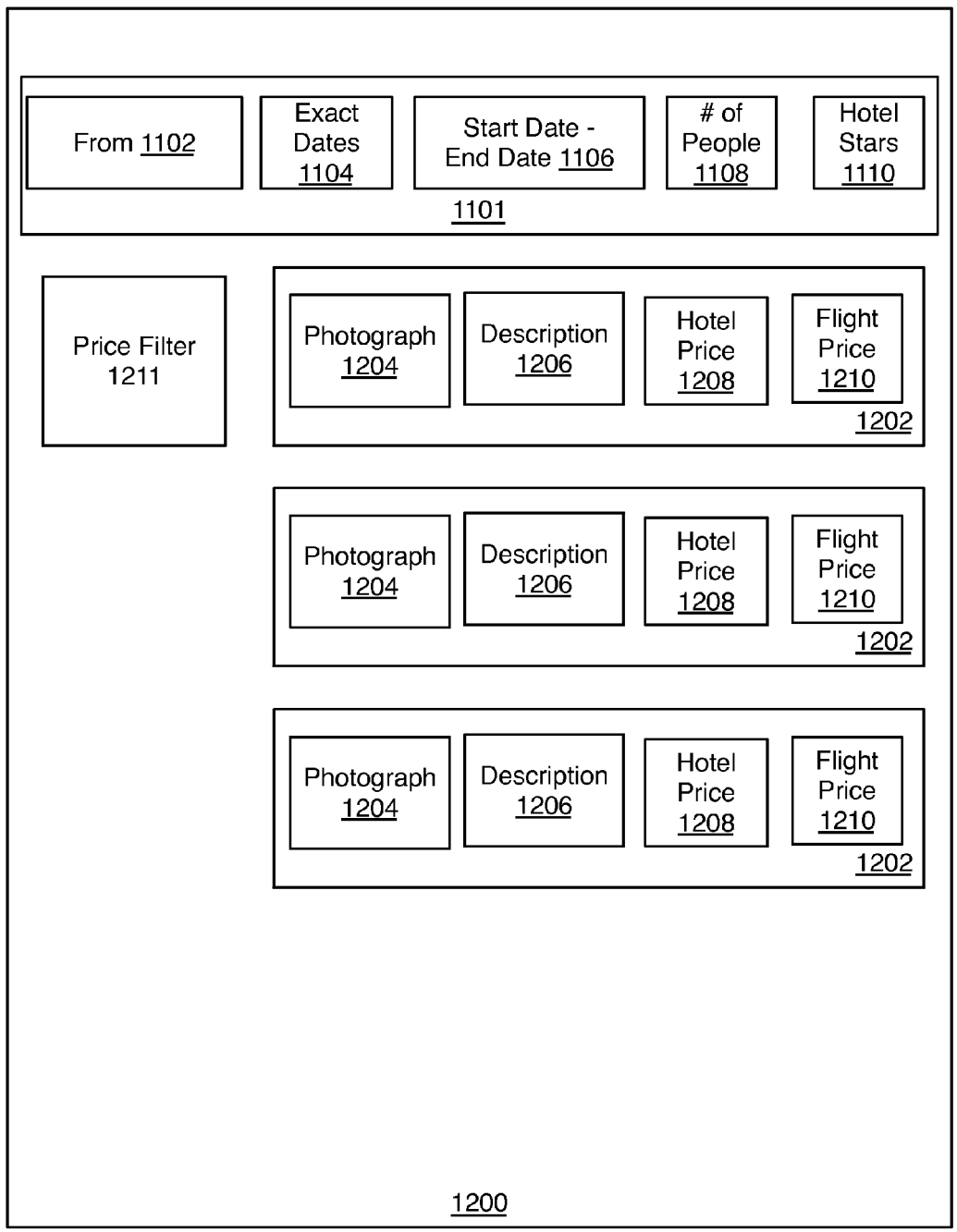
FIG. 12 illustrates an example travel query results interface.

FIG. 12 illustrates an example travel query results interface 1200 for providing travel query results. The travel query results interface 1200 can be implemented similarly to travel search engine interface 1100 as described with reference to FIG. 11.

In some implementations, the query results interface 1200 includes a travel query option section 1101 as described above with reference to FIG. 11. Where a user enters data into the travel query option section 1101, it can cause the system to provide updated travel query results reflective of the data entered into the travel query option section 1101. The travel query option section 1101 can be configured to provide the updated travel query results without refreshing the entire travel query results interface 1200, for example by using JavaScript.

The travel query results interface 1200 includes one or more travel query results each displayed in a travel query results section 1202. The travel query results section 1202 can be displayed so as to distinguish one travel query result from another, for example as a box. In some implementations, the travel query results section 1202 includes a photograph 1204, a description 1206, a hotel price 1208, and a flight price 1210, each of which is described in greater detail with reference to FIG. 8. The photograph 1204, the description 1206, the hotel price 1208, and the flight price 1210 may be arranged in any order, linearly, horizontally, or in a grid.

In some implementations, the photograph 1204 includes multiple photographs that can be displayed all at the same time or one at a time. In some implementations, the hotel price 1208 and the flight price 1210 include links that direct to one or more locations where the hotel or flight can be purchased.

In some implementations, the travel query results interface 1200 includes a price filter 1211. The price filter 1211 can take one or more forms, for example a list of links each associated with a price or price range, or one or more fields for entering a price or price range. Responsive to user interaction with the price filter 1211, the travel query results interface 1200 can provide updated travel query results filtered on price without refreshing the entire travel query interface 1200, for example by using JavaScript.

Figure 13:
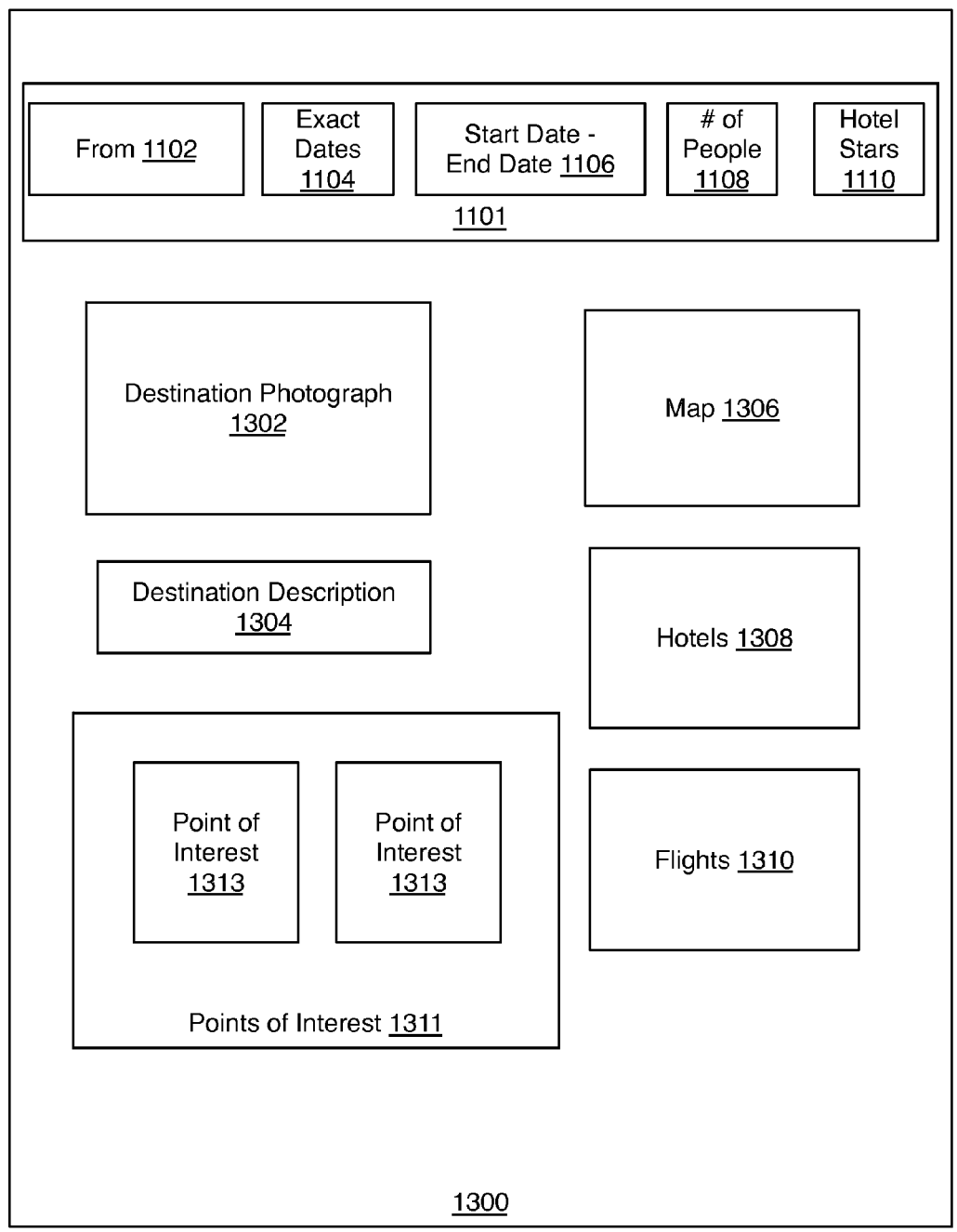
FIG. 13 illustrates an example destination page.

FIG. 13 illustrates an example destination page 1300 for providing information about a destination, as described with reference to FIG. 9. The destination page 1300 can be implemented similarly to travel search engine interface 1100 as described with reference to FIG. 11

In some implementations, the destination page 1300 includes a travel query option section 1101 as described above with reference to FIGS. 11-12. Where a user enters data into the travel query option section 1101, the destination page 1300 can cause the system to provide updated data for the destination without refreshing the entire destination page 1300, for example, by using JavaScript.

In some implementations, the destination page 1300 includes a destination photograph 1302, as described with reference to FIG. 9. The destination photograph 1302 can include multiple photographs some or all of which can be displayed at the same time.

In some implementations, the destination page 1300 includes a destination description 1304, as described with reference to FIG. 9.

In some implementations, the destination page 1300 includes a map 1306. The map can be an embedded map provided by one or more map providers and centered on a geographic location associated with the destination.

In some implementations, the destination page 1300 includes hotels information 1308. The hotels information 1308 is based on the hotel data as described with reference to FIG. 9. The hotels information 1308 can include links that direct to a location where a hotel can be purchased.

In some implementations, the destination page 1300 includes flights information 1310. The flights information 1310 is based on the flight data as described with reference to FIG. 9. The flights information 1310 can include links that direct to a location where a flight can be purchased.

In some implementations, the destination page 1300 includes a points of interest section 1311. The points of interest section 1311 can include information 1313 about one or more points of interest. The points of interest can be selected as described with reference to FIG. 9. The points of interest information 1313 can include one or more photographs or a description as described with reference to FIG. 9.

Figure 14:
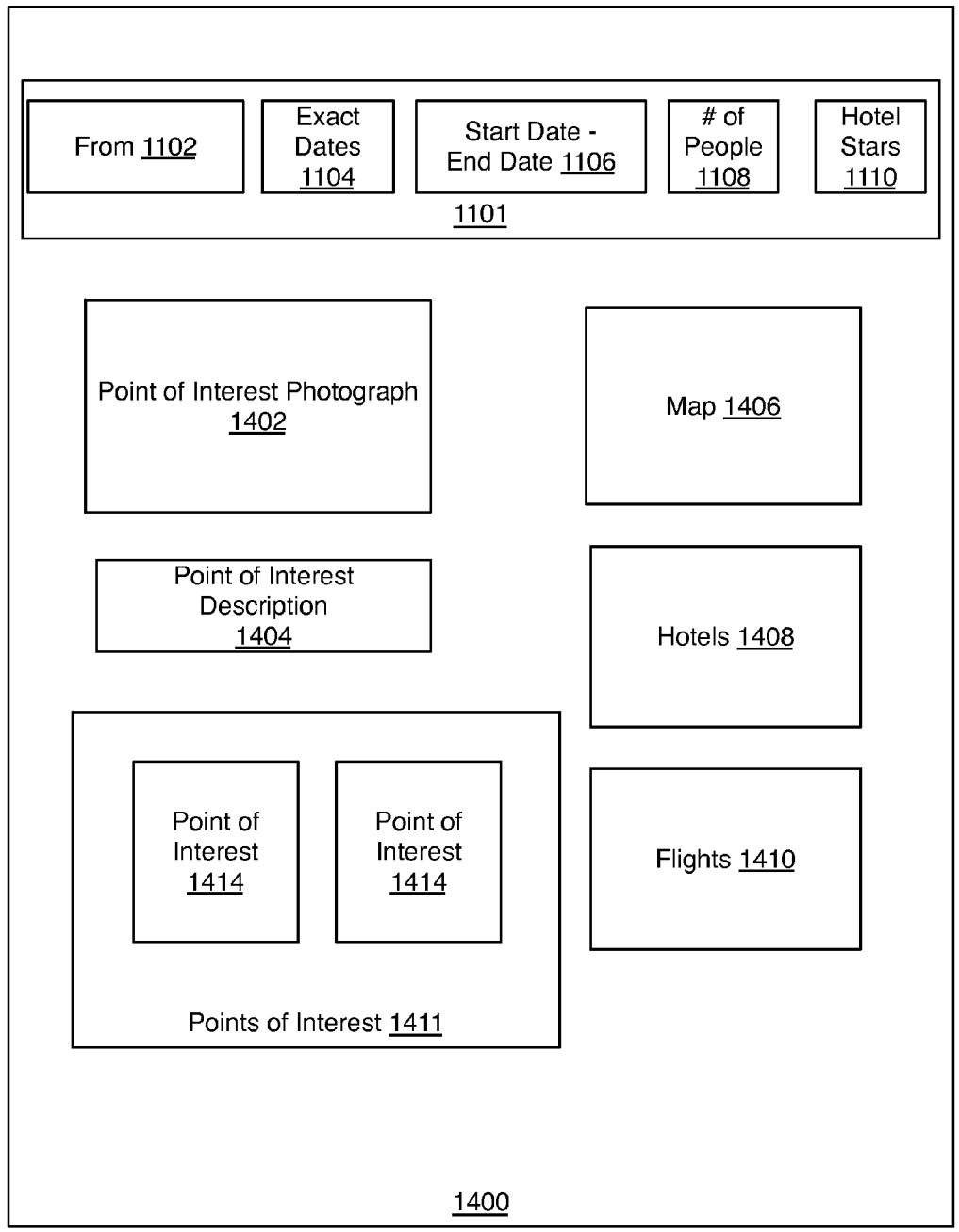
FIG. 14 illustrates an example point of interest page.

FIG. 14 illustrates an example point of interest page 1400 for providing information about a destination, as described with reference to FIG. 10. The point of interest page 1400 is substantially similar to the destination page 1300 as described with reference to FIG. 13, with the exceptions that the point of interest page 1400 includes a point of interest photograph 1402 and a point of interest description 1404 as described with reference to FIG. 10. The point of interest photograph 1402 can include multiple photographs, some or all of which can be displayed at the same time.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, comprising:
   identifying, by operation of a system comprising one or more computers, a plurality of points of interest associated with a travel location by querying a geographic data store that includes data mapping travel locations to points of interest;
   determining, by operation of the system, for each of the plurality of points of interest:
      a count of travel related documents that refer to the point of interest and refer to an activity,
      a count of travel related queries that refer to the point of interest and to the activity,
      a count of photographs that are geographically related to the point of interest, and
      a popularity score for the activity based at least in part on the count of travel documents, the count of travel queries, and the count of photographs; and
   selecting, by operation of the system, a selected point of interest based at least in part on the respective popularity scores.

2. The method of claim 1 wherein the travel related documents include web pages having terms associated with travel.

3. The method of claim 1 wherein the travel related documents include social network posts having terms associated with travel.

4. The method of claim 1 wherein the travel related documents include social network pages having terms associated with travel.

5. The method of claim 1 wherein the travel related queries include terms associated with travel and the point of interest.

6. The method of claim 1 wherein each of the plurality of photographs that is associated with a respective geographic location is within a threshold distance from the point of interest.

7. The method of claim 1, further comprising:
   determining for each of the plurality of points of interest, by operation of the system, a combined query distance by calculating the distances between locations associated with the travel related queries and the point of interest;
   wherein the respective popularity scores for the plurality of points of interest is based at least in part on the respective combined query distance.

8. The method of claim 1, further comprising:
   receiving a travel query; and
   determining, by operation of the system, the travel location and an activity based at least in part on the travel query;
   wherein the travel related documents are documents that refer to the activity and the travel related queries are queries that refer to the activity.

9. The method of claim 1 wherein the travel location is a city.

10. A system comprising:
    one or more computers and one or more storage devices storing instructions that are operable, when executed by the one or more computers, to cause the one or more computers to perform operations comprising:
      identifying, by operation of a system comprising one or more computers, a plurality of points of interest associated with a travel location by querying a geographic data store that includes data mapping travel locations to points of interest;
      determining, by operation of the system, for each of the plurality of points of interest:
        a count of travel related documents that refer to the point of interest and refer to an activity,
        a count of travel related queries that refer to the point of interest and to the activity,
        a count of photographs that are geographically related to the point of interest, and
        a popularity score for the activity based at least in part on the count of travel documents, the count of travel queries, and the count of photographs; and
      selecting, by operation of the system, a selected point of interest based at least in part on the respective popularity scores.

11. The system of claim 10 wherein the travel related documents include web pages having terms associated with travel.

12. The system of claim 10 wherein the travel related documents include social network posts having terms associated with travel.

13. The system of claim 10 wherein the travel related documents include social network pages having terms associated with travel.

14. The system of claim 10 wherein the travel related queries include terms associated with travel and the point of interest.

15. The system of claim 10 wherein each of the plurality of photographs that is associated with a respective geographic location is within a threshold distance from the point of interest.

16. The system of claim 10, further comprising:
determining for each of the plurality of points of interest, by operation of the system, a combined query distance by calculating the distances between locations associated with the travel related queries and the point of interest;
wherein the respective popularity scores for the plurality of points of interest is based at least in part on the respective combined query distance.

17. The system of claim 10, further comprising:
receiving a travel query; and
determining, by operation of the system, the travel location and an activity based at least in part on the travel query;
wherein the travel related documents are documents that refer to the activity and the travel related queries are queries that refer to the activity.

18. The system of claim 10 wherein the travel location is a city.

19. A non-transitory computer storage medium encoded with instructions that, when executed by one or more computers, cause the one or more computers to perform operations comprising:
identifying, by operation of a system comprising one or more computers, a plurality of points of interest associated with a travel location by querying a geographic data store that includes data mapping travel locations to points of interest;
determining, by operation of the system, for each of the plurality of points of interest:
a count of travel related documents that refer to the point of interest and refer to an activity,
a count of travel related queries that refer to the point of interest and to the activity,
a count of photographs that are geographically related to the point of interest, and
a popularity score for the activity based at least in part on the count of travel documents, the count of travel queries, and the count of photographs; and
selecting, by operation of the system, a selected point of interest based at least in part on the respective popularity scores.

20. The non-transitory computer storage medium of claim 19 wherein the travel related documents include web pages having terms associated with travel.

21. The non-transitory computer storage medium of claim 19 wherein the travel related documents include social network posts having terms associated with travel.

22. The non-transitory computer storage medium of claim 19 wherein the travel related documents include social network pages having terms associated with travel.

23. The non-transitory computer storage medium of claim 19 wherein the travel related queries include terms associated with travel and the point of interest.

24. The non-transitory computer storage medium of claim 19 wherein each of the plurality of photographs that is associated with a respective geographic location is within a threshold distance from the point of interest.

25. The non-transitory computer storage medium of claim 19 further encoded with instructions, that when executed by the one or more computers, further cause the one or more computers to perform operations comprising:
determining, for each of the plurality of points of interest, a combined query distance by calculating the distances between locations associated with the travel related queries and the point of interest;
wherein the respective popularity scores for the plurality of points of interest is based at least in part on the respective combined query distance.

26. The non-transitory computer storage medium of claim 19 further encoded with instructions, that when executed by the one or more computers, further cause the one or more computers to perform operations comprising:
receiving a travel query; and
determining the travel location and an activity based at least in part on the travel query;
wherein the travel related documents are documents that refer to the activity and the travel related queries are queries that refer to the activity.

* * * * *